United States Patent
Brozik et al.

(10) Patent No.: US 12,259,539 B2
(45) Date of Patent: Mar. 25, 2025

(54) OPTICAL MICROSCOPE

(71) Applicant: SMI DRUG DISCOVERY LIMITED, Cambridge (GB)

(72) Inventors: James Alan Brozik, Pullman, WA (US); Andrew James Thompson, Cambridge (GB)

(73) Assignee: SMI DRUG DISCOVERY LIMITED, Cambridge (GB)

( * ) Notice: Subject to any disclaimer, the term of this patent is extended or adjusted under 35 U.S.C. 154(b) by 464 days.

(21) Appl. No.: 17/616,595

(22) PCT Filed: Jun. 3, 2020

(86) PCT No.: PCT/GB2020/051336
§ 371 (c)(1),
(2) Date: Dec. 3, 2021

(87) PCT Pub. No.: WO2020/245579
PCT Pub. Date: Dec. 10, 2020

(65) Prior Publication Data
US 2022/0229280 A1  Jul. 21, 2022

(30) Foreign Application Priority Data
Jun. 4, 2019 (GB) ................................. 1907953

(51) Int. Cl.
G02B 21/00 (2006.01)
(52) U.S. Cl.
CPC ..... G02B 21/0072 (2013.01); G02B 21/0032 (2013.01); G02B 21/0076 (2013.01)

(58) Field of Classification Search
None
See application file for complete search history.

(56) References Cited

U.S. PATENT DOCUMENTS

| | | |
|---|---|---|
| 7,456,954 B2 | 11/2008 | Weiss et al. |
| 8,704,196 B2 | 4/2014 | Wolleschensky et al. |
| 9,019,363 B2 | 4/2015 | MacKay et al. |
| 9,030,546 B2 | 5/2015 | Okamoto |
| 9,372,330 B2 | 6/2016 | Amano et al. |
| 10,386,623 B2 | 8/2019 | Visscher et al. |

(Continued)

FOREIGN PATENT DOCUMENTS

| | | |
|---|---|---|
| CA | 2192986 A1 | 1/1996 |
| CN | 1782698 A | 6/2006 |

(Continued)

OTHER PUBLICATIONS

International Search Report and Written Opinion mailed Oct. 26, 2020.

(Continued)

*Primary Examiner* — Robert E. Tallman
(74) *Attorney, Agent, or Firm* — Thomas Horstemeyer, LLP

(57) ABSTRACT

An optical microscope (10) comprising a first optical microscope (R); and a second optical microscope (Q) with a different mode of operation to the first optical microscope (R). The optical microscope (10) is configured such that the first optical microscope (R) and the second optical microscope (Q) simultaneously view a sample on a sample stage (I).

19 Claims, 9 Drawing Sheets

(56) References Cited

U.S. PATENT DOCUMENTS

| | | | |
|---|---|---|---|
| 10,530,639 | B2 | 11/2020 | Urban et al. |
| 2003/0155527 | A1 | 8/2003 | Natori |
| 2005/0234656 | A1 | 10/2005 | Schwartz et al. |
| 2007/0097496 | A1 | 5/2007 | Ulrich et al. |
| 2007/0109536 | A1 | 5/2007 | Weiss et al. |
| 2009/0052021 | A1 | 2/2009 | Mogami et al. |
| 2010/0140504 | A1 | 6/2010 | Webb et al. |
| 2010/0184012 | A1* | 7/2010 | Voelker ............... A01N 1/0236 435/2 |
| 2012/0208291 | A1 | 8/2012 | Davis et al. |
| 2013/0068967 | A1 | 3/2013 | Kleppe et al. |
| 2014/0293407 | A1 | 10/2014 | Amano et al. |
| 2018/0074306 | A1* | 3/2018 | Visscher ............... G06T 3/153 |
| 2018/0303573 | A1* | 10/2018 | Trulson ............... G02B 21/16 |
| 2020/0333249 | A1 | 10/2020 | Wang et al. |

FOREIGN PATENT DOCUMENTS

| | | |
|---|---|---|
| CN | 101802675 B | 9/2014 |
| CN | 103676123 B | 1/2016 |
| CN | 107101981 A | 8/2017 |
| CN | 108956561 A | 12/2018 |
| EP | 3306307 A1 | 4/2018 |
| GB | 2018074090 | 5/2018 |
| GB | 2535141 B | 12/2018 |
| JP | 2000162506 A | 6/2000 |
| JP | 2001506955 A | 3/2007 |
| JP | 2007072391 A1 | 3/2007 |
| JP | 2008256927 A | 10/2008 |
| JP | 2013533513 A | 8/2013 |
| JP | 2015082099 A | 4/2015 |
| JP | 2019049756 A | 3/2019 |
| WO | 2005031431 A1 | 4/2005 |
| WO | 2008032096 A2 | 3/2008 |
| WO | 2008099163 A1 | 8/2008 |
| WO | 2009056831 A1 | 5/2009 |
| WO | 2015059682 A1 | 4/2015 |
| WO | 2016049544 A1 | 3/2016 |
| WO | 2016168941 A1 | 10/2016 |
| WO | 2016170370 A3 | 10/2016 |
| WO | 2020037175 A1 | 2/2020 |
| WO | 2020206362 A1 | 10/2020 |

OTHER PUBLICATIONS

GB Search Report dated Dec. 3, 2019.

Barden et al. "Tracking Individual Membrane Proteins and Their Biochemistry: The Power of Direct Observation", https://www.sciencedirect.com/science/article/pii/S0028390815001847, 2015.

Marquis et al. "Doxyxyxline-controlled splicing modulation by regulated antisense U7 snRNA expression cassettes", www.nature.com/gt, 2009.

Crocker et al. "Methods of Digital Video Microscopy for Colloidal Studies", Journal of Colloid and Interface Science 179, 298-310, 1996.

Silva-Lopez et al. "Near native binding of a fluorescent serotonin conjugate to serotonin type 3 receptors", www.elsevier.com/locate/bmcl, 2013.

Kassiou et al. "P2X purinergic receptor ligands: Recently patented compounds" hhtps://www.researchgate.net/publication/41806259, 2010.

Wiznerowicz et al. "Conditional Suppression of Cellular Genes: Lentivirus Vector-Mediated Drug-Inducible RNA Interference" Journal of Virology, p. 8957-8961, 2003.

Tamm et al. "Supported Phospholipid Bilayers" Biophysical Journal, v. 47, p. 105-113, 1985.

Shu et al. "Mammalian expression of infrared fluorescent proteins engineered from a bacterial phytochrome" NIH-PA Author Manuscript, 2009.

Ruepp et al. "A fluorescent approach for identifying P2X1 ligands" www.elsevier.com/locate/neuropharm, 2015.

Poudel et al. "A Guide to Tracking Single Transmembrane Proteins in Supported Lipid Bilayers", Methods in Molecular Biology, vol. 974, p. 233-252, 2013.

Poudel et al. "Single Particle Tracking Reveals Corralling of a Transmembrane Protein in a Double-Cushioned Lipid Bilayer Assembly", www.pubs.acs.org/Langmuir, 2011.

Mansoor et al. "X-ray structures define human P2X3 receptor gating cycle and antagonist action", doi:10.1038/nature19367, 2016.

Braeckmans et al. "Line FRAP with the Confocal Laser Scanning Microscope for Diffusion Measurements in Small Regions of 3-D Samples", doi:10.1529/biophysj.106.099838, 2007.

Kawate et al. "Crystal Structure of the ATP-gated P2X4 ion channel in the closed state", doi:10.1038/nature08198, 2009.

Hattori et al. "Molecular mechanism of ATP binding and ion channel activation in P2X receptors", doi:10.1038/nature11010, 2012.

Gillespie "Exact Stochastic Simulation of Coupled Chemical Reactions", The Journal of Physical Chemistry, vol. 81, 1977.

Diaz et al. "Double Cushions Preserve Transmembrane Protein Mobility in Supported Bilayer Systems", doi:10.1021/la800018d, 2008.

Brozik et al. "Single Molecule Kinetic Measurements and Hidden Markov Models for P2X1 Receptors", https://www.cell.com/biophysj/pdf/S0006-3495(16)33612-8.pdf, 2017.

Axelrod et al. "Mobility Measurement by Analysis of Fluorescence Photobleaching Recovery Kinetics", Biophysical Journal, vol. 16, p. 1055-1069, 1976.

Albertorio et al. "Fluid and Air-Stable Lipopolymer Membranes for Biosensor Applications", doi:10.1021/la050871s, 2005.

Poudel et al. "The effect of a phase transition on single molecule tracks of Annexin V in cushioned DMPC assemblies", doi:10.1039/c2sm26040a, 2012.

Kubitscheck et al., "Two-photon scanning microphotolysis for three-dimensional data storage and biological transport measurements"; First published: Jun. 1996; https://doi.org/10.1046/j.1365-2818.1996.60424.x Citations: 22.

Prive, "Detergents for the stabilization and crystallization of membrane proteins", ScienceDirect, Methods 41 (2007) 388-397.

Written Opinion dated Apr. 18, 2024 (Appln. No. 11202113220T).

* cited by examiner

SAMPLE CHAMBER SCHEMATIC
FIGURE 5
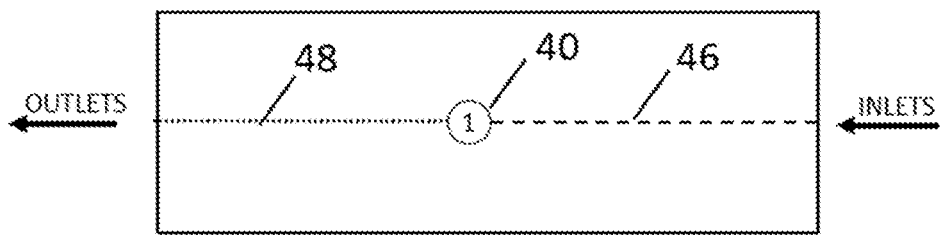
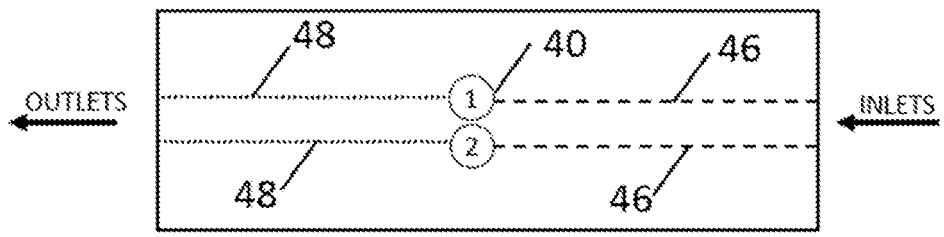
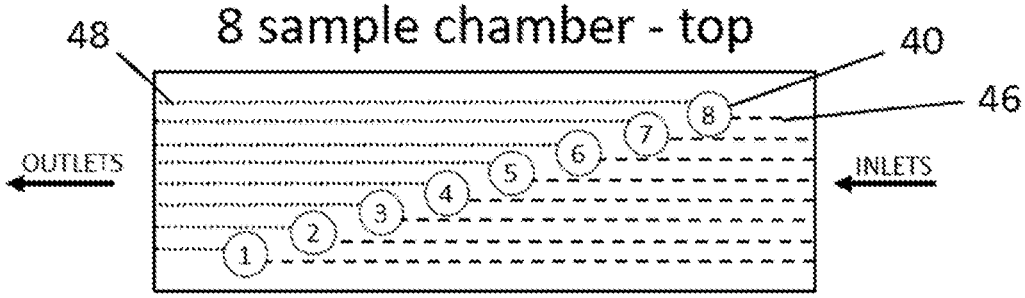
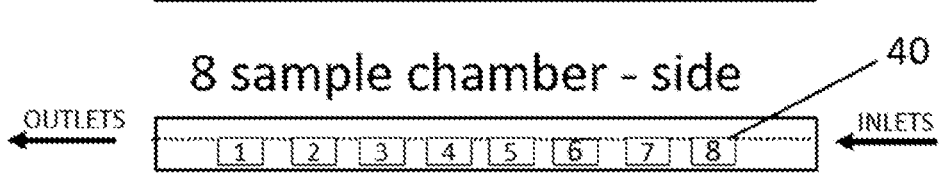
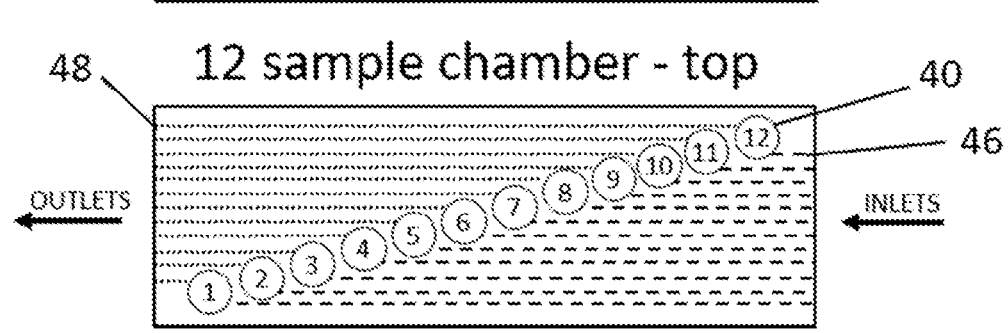

OPTICAL MICROSCOPE

CROSS-REFERENCE TO RELATED APPLICATION

This application is the 35 U.S.C. § 371 national stage application of PCT Application No. PCT/GB2020/051336, filed on Jun. 3, 2020, and entitled "AN OPTICAL MICROSCOPE," which claims priority to and the benefit of GB Patent Application Nos. 1907953.2 dated Jun. 4, 2019. The entire content of these applications are incorporated by reference herein.

FIELD OF THE INVENTION

The present invention relates to an optical microscope, particularly for high resolution or super resolution microscopy, a super resolution optical microscope, a super resolution optical microscopy sample enclosure, and a sample surface.

BACKGROUND OF THE INVENTION

Microscopes are instruments that allow things to be seen that are too small to be seen by a human eye. Optical microscopy is a microscopy technique that uses light to produce an image. Optical microscopes are available that operate in different modes. That is to say, while they all use light to capture magnified images of small objects, the underlying methodology is different. For example, the basic types of optical microscopes are simple microscopes that use a single lens for magnification, and compound microscopes that use a plurality of lenses. In a compound microscope, a so-called objective lens close to the object being viewed is used to collect light. This provides the viewer with an enlarged inverted virtual image of the object. This focuses a real image of the object being imaged inside the microscope. This image is then magnified by a second lens or group of lenses in an eye piece of the microscope. Other modes of optical microscopy include confocal microscopy and total internal fluorescence (TIRF) microscopy.

In confocal microscopy, a small beam of light is focussed at one narrow depth of a sample at a time. This is in contrast to the basic types of microscope mentioned above in which light travels through the sample as far as it can penetrate. In confocal microscopy, a spatial pinhole is used to block out-of-focus light in image formation. Only light produced by fluorescence very close to the focal plane is detected. However, as much of the light from sample fluorescence is blocked at the pinhole, there is low signal intensity and so a sensitive detector such as a photomultiplier tube or avalanche photodiode are used. Together, this results in optical resolution much better than that of the basic types of microscope mentioned above.

In TIRF, a sample is located on a glass slide in a fluid or liquid, such as water. An evanescent wave is used to selectively illuminate and excite fluorophores in the sample. An evanescent wave travels along the glass-fluid or glass-liquid interface with an amplitude that falls off exponentially with distance from the interface. Fluorophores are fluorescent chemical compounds that re-emit light once they are excited by light a restricted region of the sample immediately adjacent to a glass-fluid interface. This re-emitted light is collected by an objective lens of the microscope. The evanescent wave is generated only when the incident light is totally internally reflected at the glass-fluid interface. As the evanescent wave decays exponentially from the interface, it penetrates to only approximately 100 nm into the sample. As discussed, in TIRF a glass-fluid interface is required. The fluid is located in a light transparent glass bath with the sample located on the base of the open bath. The objective lens is located below the bath. TIRF can be used to observe the fluorescence of a single molecule.

The use of optical microscopy to observe biological processes in particular has undergone huge advances in the last decade. There have been significant advances in resolution including high resolution, often called, super resolution microscopy with resolutions as low as 100 nm or less. Many of the developments have focused on achieving higher resolution. However, the instruments are often complex, are often built in-house, and require considerable user knowledge to operate. In addition, movements within the resultant images can compromise precision, and become an increasing challenge as the magnification is raised. To emphasise super resolution optical microscopes with resolutions as low as 100 nm or less are very sensitive to even the most minute movements in the environment in which they operate.

High resolution microscopy with resolution as low as 15 to 20 nm or even lower such as 1.5 nm resolution are desirable, particularly for drug discovery, as it would allow for particularly effective single molecule imaging.

Understanding how drugs bind to their receptors is the most fundamental purpose of pharmacological research that enables the effective development of novel therapeutics. Monitoring kinetic properties is critical, but often based on limited macroscopic measurements. Currently, deterministic measurements are made using methods that yield ensemble averages (e.g. radioligand binding, surface plasmon resonance (SPR), X-ray crystallography). Techniques such as single-channel patch clamp go some way towards monitoring the properties of single molecules, but are composite measurements of both ligand binding and a functional response, and can only be used for receptors that are functionally coupled to ion channels.

Current pharmokinetic models for drug metabolism are also based entirely on macroscopic kinetics experiments and crude deterministic kinetic models, devoid of the actual stochastic molecular detail of the enzymes, receptors or other samples; resulting in numerous promising drugs never reaching clinical trials. There is a need to provide a tool for researchers, healthcare institutions, governmental drug regulatory bodies, and the pharmaceutical industry to monitor the underlying molecular scale properties such as drug-protein, antibody-epitope and protein-protein interactions by providing the raw data for realistic stochastic kinetic modelling. The incorporation of these concepts and measurements could result in greater drug safety and an increase in life-saving pharmaceuticals reaching clinical trials.

BRIEF SUMMARY OF THE INVENTION

Broadly, the inventors have appreciated that an optical microscope and, in particular a super resolution microscope, comprising two different optical microscopes that each operate simultaneously using a different mode to view a sample provide enhanced resolution images of the sample. The optical microscope is a multi-modal or bi-modal optical microscope. In the arrangements described, molecular-scale resolution is provided that enables single molecules to be observed.

The invention in its various aspects is defined in the independent claims below to which reference should now be made. Optional features are set forth in the dependent claims.

Arrangements are described in more detail below and take the form of an optical microscope comprising a first optical microscope; and a second optical microscope with a different mode of operation to the first optical microscope. The optical microscope is configured such that the first optical microscope and the second optical microscope simultaneously view a sample on a sample stage. In the examples described, the first optical microscope is a confocal microscope; and the second optical microscope is a TIRF microscope. Broadly, in this example, the confocal microscope is used to image a sample. The TIRF microscope is used to correct for position drift in the X,Y plane or horizontal plane of the microscope or in the sample being imaged to correct images from the confocal microscope. The confocal microscope is used to correct images in the Z or vertical direction.

The optical microscope described herein is widely applicable and provides a direct optical microscopy method of monitoring drug binding that provides single molecule imaging (SMI). This enables observations of phenomena such as ligand-receptor interactions and single-protein tracking. In these approaches, the interactions of purified receptors, enzymes or other biological samples with their ligands, substrates or other interacting molecules are monitored by time-lapse optical microscopy. In the examples described, a ligand is a substance that forms a complex with a biomolecule. The results are direct observations of single receptors bound with one or more of their ligands, state changes in protein membrane interactions and augmented protein-protein interactions. The resultant moving images of these events can be analysed to determine key components of the interactions, such as the number, position, and rate constants of individual molecules or proteins.

A method is described that provides a fully automated and integrated method of sample preparation and image capture that automatically corrects for positional movements to enable the observation of single molecule interactions at high spatial resolution (such as 100 nm or less, for example, 15 to 20 nm or even as low as 1.5 nm) and time-resolution (for example, 1 ms or less, 500 μm or less, or 100 μm or less, such as 1 ms to 500 μm or 1 ms to 100 μm). The positional movement correction, in the Z direction, is in real time. That is to say, as an image is sampled, positional movement or drift in the Z direction is corrected as the sample is imaged, such as by moving the sample stage. In contrast, the positional movement correction, in the X and Y directions (horizontal plane), is carried out after the event. In other words, captured images of a sample are corrected for drift after they have been captured. There is no real time movement of the sample stage. As an example, herein arrangements are described that measure single molecule interactions with high temporal and spatial resolution using a super-resolution microscope design, embedded elements, sample preparation methods and a combination of hardware and software algorithms to identify with high-precision the location of molecules using frame-to-frame correction for sample movements throughout the experiment.

Examples described herein provide a method for preparing samples and the subsequent imaging of molecular interactions using a fully automated confocal super-resolution plus super-resolution wide-field instrument designed for high temporal resolution. All of the functions for sample preparation, image capture and image analysis are fully automated via computer control. In this way, the optical microscope is simple to operate.

An automated super-resolution kinetic microscope is described that utilises simultaneous fast confocal imaging, laser scanning, and total internal reflection fluorescence (TIRF) microscopy techniques to measure the stochastic binding kinetics of interacting molecules and proteins with nano-scale spatial resolution. Lasers are accessed by computer, and a fast acousto-optic laser scanner (or galvanometer) is used to scan samples and identify regions of interest via automated positioning. Nanometer-scale drift correction of confocal images in the X-direction and Y-direction is accomplished with embedded fiducial markers excited in TIRF mode by a laser (TIRF laser wavelength can be in the visible or near infrared depending on the fiducial marker chosen; fiducial markers used are explained further below). X-direction and Y-direction frame-by-frame super resolution triangulation and correction is accomplished by post-processing without the need of imaging stage feedback (imaging stage feedback limits the spatial resolution). In other words, the X,Y plane drift correction is carried out after imaging a sample. The drift correction based on a plurality of images does not result in movement of the sample stage. It results in computer processing after the image capturing event. In other words, computer processing of already captured and stored images. Z-direction correction is accomplished with a position sensor coupled to the Z-focus on the instrument and is achieved in real time to keep the sample in the focus continuously. Automated temperature cycles are used for sample preparation and in situ conjugation chemistry. Software algorithms are used that take into account movements and point-spread reconstruction. A computer, computerized method, computer readable medium, non-transitory computer readable medium comprising program code for carrying out the computerized method (such as a hard disk drive or solid state storage such as a USB flash drive) and a computer program for carrying out the computerized method may be used.

The instrument incorporates automated temperature cycling that enables lipid formation and conjugation chemistry, followed by visualisation by automated optical microscopy. A confocal and TIRF arrangement enables the simultaneous monitoring of both target elements and embedded fluorescent reference elements independently of one another. The reference elements are excited by a laser in TIRF mode and the fluorescence is directed towards an electron multiplying charge coupled device (EMCCD) camera, and a super-resolution constellation map is generated for every frame in the data collection. A second laser or lasers are configured for fast scanning confocal laser excitation and the fluorescence from the sample is directed to a single photon counting avalanche photo-diode (APD). Examples include a combination of simultaneous super-resolution confocal imaging, super-resolution wide-field imaging, photon-by-photon spatial-tagging, and the time-tagging of collected photons. Software algorithms use the data gathered from this instrument to reconstruct super-resolution images.

Broadly, methods are disclosed for automated sample preparation and super-resolution imaging of molecular interactions.

The optical measurements are made via an automated optical system that comprises filters, mirrors, laser scanners, lenses and lens combinations to focus and position laser light onto a sample via an objective lens that sits directly above the sample (as illustrated in FIGS. 1 and 2 and described in detail below). The imaging stage provides an environment that is both thermally and vibrationally stable, and contains integrated channels that enable the microfluidic application of buffers and test compounds to the sample. Automated confocal laser scanning of the sample accounts for any positional movements within the sample and identifies regions of interest that are interrogated at higher spatial and temporal resolution via an automated computational process. Subsequent frame-to-frame drift correction and imaging processing provides a means to interrogate the kinetic properties of single molecules and or proteins over very long period of time (more than 24 hours if needed) leading to an unprecedented level of statistical confidence.

The instrument comprises an enclosure containing an integral imaging stage, microfluidics, laser optics that enable simultaneous laser scanning confocal and total internal reflection fluorescence (TIRF) microscopy, and an imaging system (as illustrated in FIG. 3 and described in detail below).

The method may be used with optical microscopes that produce an image of super-resolution. Examples of optical microscopes include those suitable for TIRF and confocal microscopy. TIRF microscopy allows imaging of fluorescent molecules located close to a glass/water or glass/specimen interface. TIRF is achieved by generating an evanescent wave for excitation of the fluorophores instead of epi illumination via a source of excitation. The evanescent field occurs if incident light is totally reflected at the interface of two transparent media with different refractive indices. Often this is the interface of a glass slide or coverslip, and an aqueous solution in which the sample lies. As the energy of an evanescent field decreases exponentially with distance from the interface, only fluorescent molecules within the proximity to the coverslip are excited. This allows the creation of images with a high signal-to-noise ratio, as fluorescent molecules outside of this evanescent field are not excited. The excitation source is often directed to the specimen (although a prism may also be used) through an objective lens, which also collects the fluorescence emitted from the reference elements and target elements. Objective lenses for TIRF microscopy feature an extremely high numerical aperture (for example, NA more than or equal to 1.37, such as 1.37, 1.4, 1.45 or 1.57), allowing the excitation to have an angle of incidence greater than the critical angle, thus creating the evanescent field (numerical aperture, NA, describes the acceptance cone of the objective lens). With a higher NA, penetration depth of the evanescent field is reduced, as the angle of incidence of excitation is reduced. As described above, confocal microscopy is an optical imaging technique for increasing optical resolution and contrast by means of using a spatial pinhole or aperture free techniques using small diameter sensors (like single photon counting APD) to block out-of-focus light in image formation. Also, as described above, a confocal microscope uses point illumination in an optically conjugate plane in front of, or at, the detector to eliminate out-of-focus signal and improve optical resolution. Sensitive detectors, usually APDs, transform the light signal into an electrical one that is recorded by a computer.

Significantly, samples are prepared and imaged using a flow chamber consisting or comprising of a sandwich constructed from, for example, glass, acrylic, plastic, or metal base and a glass imaging surface (as illustrated in FIG. 4 and described in detail below). Samples are located within cylindrical depressions (typically 1, 2, 8, 12 or more depressions) etched within the base surface or imaging surface, each of which can be accessed via etched channels that allow buffers and test solutions to be continuously introduced from outside the flow chamber and passed over the surface of immobilised samples contained within. The glass base is adhered to the imaging surface, forming an enclosed space through which fluids can pass without spillage. Similarly, drops hanging from a surface may be imaged. This is significant as it enables high resolution or super-resolution microscopy in which the optical elements, particularly an expensive objective lens, is located above the sample. In this way, any spilt fluid does not fall onto the objective lens, which would otherwise damage it.

The flow chamber is mounted on an imaging stage manufactured from, for example, invar steel, a nickel-iron alloy that is noted for its low coefficient of thermal expansion and low heat conductivity (as illustrated in FIG. 5 and described in detail below). The flow chamber is immobilised on the imaging stage with clamps that incorporate microfluidic channels that directly couple with the etched glass channels in the flow chamber and enable test solutions to pass across the contained samples. The imaging stage incorporates a temperature-controlled device or Peltier device that allows automated temperature cycling for sample preparation and for imaging at user-defined temperatures that are controlled by a computer with milli-Kelvin precision.

To emphasise, in addition to automated sample preparation via time and temperature cycling, the same example instrument provides a means of automated optical microscopy that scans for reference and target elements, and focusses and captures images for analysis. A system for accounting for changes in the positions of reference and target elements within the sample is described that enables automation of image processing, and super-resolution analysis of the kinetic properties that define the interaction of single molecules. An advantage of the claimed method is that correction in the X-plane and Y-plane or horizontal plane is performed after measurements have been made. As such, positional drift is continuously monitored and a permanent record of the correction is made. This increases accuracy as images may be compared as a continuous sequence of events before and after the point of measurement and any sudden and unexpected changes in the behaviour of the reference and target elements may be later identified and re-assessed for accuracy. As such, the instrument simultaneously monitors both the experimental outcome and the corrective changes that were necessary to achieve it. Drift correction in the Z-plane is also provided, and is performed in real time to the keep the sample continually in focus. This is accomplished with sub-diffraction limited resolution by continuously monitoring the back reflection from the TIRF laser on a position sensor and adjusting focus on the microscope objective with nanometer precision.

In the examples described, sample stabilisation is achieved through vibrational damping and the use of invar or invar steel, which displays low levels of expansion or contraction with temperature changes. Image stability is also assisted by the use of fluid-based cooling systems to reduce vibration within the instrument and a benchtop active-air vibration isolation system with PID (proportional integral derivative) control.

Reference elements or fiducial markers, in this example, may be attached to biological materials and solid surfaces. These reference elements may be polystyrene beads, fluorescent molecules (for example, Alexa 532 and ATTO-700), antibody coupled fluorophores, lipid-coupled fluorophores, proteins that do not bleach or blink, nanodiamonds, or polyethyleneimines coupled with fluorescent probe molecules. Reference elements attached to biological materials may be, for example, elements attached to free thiol groups by coupling with MTS-fluorophore reagents, photo-cross-linking compounds, antibody labels, or fluorophore elaborated ligands. Solid surfaces (for example, glass slides, cover slips) may be modified, for example, by covalent coupling (for example, coupling via groups consisting or comprising of silane, azide, acetylene, maleamide, carboxylic acid, primary amines), peptide coupling of an amino terminated silane surface, or antibody labelling of protein coated slides. Agents that are physically or chemically similar to those described may be substituted for those described. The reference element may be part of the sample or added in addition to the sample and may be placed within, or outside, the field of view of the sensor.

In the examples described, the position of the reference elements is calculated from the images captured on an image sensor, such as an EMCCD camera. These reference elements have a diffraction limited intensity distribution (described by an Airy function and approximated by a 2D-Gaussian function) that is accessible under a microscope and may be used to very accurately locate its position in two dimensions by computing the center of the point spread function of the emitted light. The intensity of the point emitter is visible when illuminated by a source of excitation such as a laser, LED illuminator, filament lamps, halogen lamps or flash lamps, and may be, for example fluorescent emission. The selection of the appropriate excitation may be determined by the physico-chemical and spectral properties of the reference and target elements. One, two, or more excitation sources may be used to enable the excitation of one or more reference elements and target elements.

The positions in the X- and Y-plane may be determined by fitting the intensities of the point spread functions to an Airy or 2D-Gaussion. In which case, the peak of the fit gives the super-resolution position.

Resolution below the diffraction limit in the Z-plane may be accomplished with the addition of a 50:50 beam splitter and a second APD (illustrated in FIG. 2 and described in detail below). In which case, the focal planes of both APDs may be set at unique calibrated focal planes within the axial confocal volume of the instrument and the Z-localization of point emitters may be determined by comparison of the point spread in each plane. Refinement of the Z-plane may be further refined by Z-piezo objective scanning with nanometer positional accuracy.

The use of reference elements or fiducial markers to enable frame-to-frame positional drift correction has several applications, for example:
1) to enable full automation of optical lens alignments and microscope optical components;
2) to enable fast super-resolution measurements of samples beyond the diffraction limit;
3) to enable refocusing during flow conditions such as inline application of test compounds;
4) to enable imaging of molecular interactions at high spatial and temporal resolution;
5) to enable measurement of kinetic parameters that describe the interaction of molecules;
6) to provide an automated method of high-throughput drug screening;
7) to enable a simplification of procedures needed to set up and align apparatus for the measurement of high-resolution events;
8) to enable the super-resolution imaging of biological materials;
9) to enable the study of protein structures by high-resolution fluorescent imaging;
10) to correct for the microscopic movements of imaged structures, resulting from influences such as thermal movements, natural movements and flow-related movements;
11) to perform frame-to-frame drift correction of sequential images captured by digital imaging
12) to enable focusing and drift correction for non-biological samples;
13) to act as a place-marker for changing experimental conditions;
14) to act as a 'bar-code' to define experimental conditions;
15) to act as a means of monitoring changes in flow conditions;
16) to act as a marker delineating unique microscopic regions of the cover glass;
17) to act as environmental sensors for local temperature, pH, ionic strength, and O2 (oxygen) levels; and/or
18) to enable the measurement of elementary rate constants and micro-equilibrium constants between discrete states within a biochemical or pharmacokinetic mechanism.

Target elements may be materials that are water or lipid soluble and may be immobilised onto the glass imaging surface, for example, by hydrophobic interactions, reactive surfaces (for example, silane coupling, azide, acetylene, maleamide, carboxylic acid, primary amines) and antibody conjugation (for example, anti-llama, anti-goat, anti-mouse). Immobilisation may be promoted by in situ, automated temperature cycling via a computer-controlled Peltier system that may be integrated into the imaging stage.

The disclosed device and method may be used with a number of sample types, for example, proteins, lipids, sugars and other materials that are embedded within a lipid membrane, whole cells (either fixed or live), organelles, molecules such RNA, DNA, oligonucleotides, small hydrophilic or hydrophobic molecules, synthetic compounds, antibodies, metals, polymers and other molecules that may be viewed by super-resolution microscopy.

The image sensor is a device that detects light signals, such as the photon streams emitted by fluorescently labelled reference elements or target elements. Such sensors may include EMCCD cameras, CCD cameras, CMOS cameras or APDs (coupled with a laser scanner) which are used for both image acquisition of the reference element and target element. Image capture of both elements enables them to be viewed, taken or saved from the sensor and the position of each element may be known with nanometer precision in two dimensions that are commonly referred to as the X- and Y-planes. Z-sections of thicker samples, such as cells, are constrained by the diffraction limit in the Z-plane. Frame-to-frame drift correction may be performed in the X-plane and Y-plane. Comparing and correcting sequences of images over extended periods of time using positional information from the reference element may be gathered both before and after the image being corrected at a specific time point. This provides a method by which the target element may be accurately rendered without distortion from movement.

BRIEF DESCRIPTION OF THE DRAWINGS

The invention will be described in more detail, by way of example, with reference to the accompanying drawings, in which:

FIG. 5 is a schematic diagram of variations of portions of the optical microscopy sample housing or chamber of FIG. 3;

DETAILED DESCRIPTION OF THE INVENTION

Figure 1:
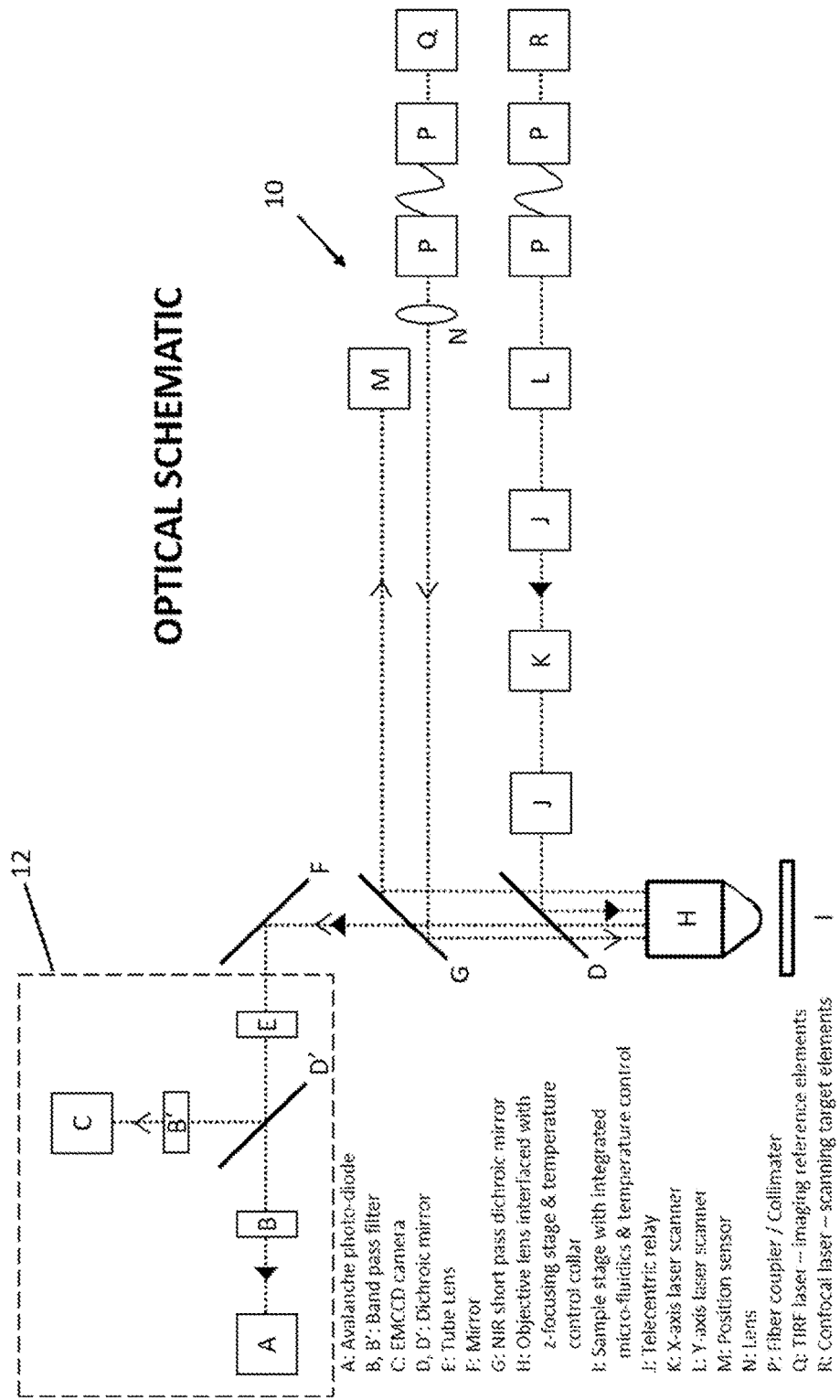
FIG. 1 is a schematic drawing of an example optical microscope embodying an aspect of the present invention.

An example optical microscope 10 will now be described with reference to FIG. 1.

As explained in more detail below, the optical microscope 10 has a confocal microscope and a TIRF microscope as an integral part of the same device. The optical microscope is housed in a single housing. The single housing is in one and only one piece. It is a single unit. This provides stability. It also allows for the optical microscope to be compact.

The confocal microscope and the TIRF microscope simultaneously view a sample through the same objective lens H. Broadly, the TIRF microscope images reference elements of the sample for X/Y plane or horizontal plane correction and the confocal microscope scans target elements of the sample and also allows for Z or vertical axis correction.

The confocal microscope includes a confocal laser R. An optical path of the laser is then through a fiber coupler and collimator P. The optical path then continues through a laser scanner K, L that scans the laser in two mutually perpendicular axes (an X-axis and a Y-axis). In this example, the Y-axis laser scanner L is first and then the X-axis laser K. A telecentric relay or lens is located in the optical path at the exit of the laser scanners. That is to say, in the optical path at the exit from the Y-axis laser scanner and a telecentric relay or lens is located in the optical path at the exit from the X-axis laser scanner.

The TIRF microscope includes a TIRF laser Q. An optical path of the laser is then through a fiber coupler and collimator P and a lens N.

Each of the optical paths of the confocal microscope and the TIRF microscope is then to a dichroic mirror D,G. The dichroic mirrors are at an angle of 45° to the optical paths from the microscope lasers. The dichroic mirror of the TIRF microscope is a near infrared (NIR) short pass dichroic mirror. A dichroic mirror is a mirror with significantly different reflection or transmission properties at two different wavelengths. In this way, the dichroic mirrors reflect light along their respective optical paths. They also allow light from the sample being imaged to not be reflected and to pass through the dichroic mirror.

An objective lens H is located in the optical path after reflection from the dichroic mirrors. Thus, a laser beam of the confocal laser R of the confocal microscope and a laser beam of the TIRF laser Q of the TIRF microscope pass through the same objective lens. In this example, the objective lens has a numerical aperture that is very high, in this example, at least or more than 1.37, such as 1.45, or at least or more than 1.45. The objective lens makes a magnified real image of the object. However, the image that would be observed would be a virtual image that cannot be detected by an electronic detector such as an EMCCD. Thus as explained further below, a tube lens is later included in the optical path, which creates an image that an electronic detector such as an EMCCD can observe or detect. A sample stage with integrated micro-fluidics and temperature control is located spaced from and underneath the objective lens of the optical microscope (the sample stage does not form part of the optical microscope as such; it is not located in the same housing as the optical microscope). One or more samples are located on the sample stage. In this way, a sample for imaging is located below the objective lens. The sample stage is described in more detail below.

A mirror F is located in the optical path to reflect light received from the sample that has passed back through the objective lens H and the dichroic mirrors D and G. The mirror is at an angle of 45° to the optical path from the sample, which is at 90° to the dichroic mirrors D and G. The mirror F reflects light to a detection portion 12. In this example, in the detection portion, the optical path is first through a tube lens E. As described above, the tube lens creates both a real and magnified image of the sample that can be observed or detected. The optical path or route from the tube lens is to a dichroic mirror D'. The dichroic mirror is parallel to the mirror F. In other words, the dichroic mirror is at 45° to the optical path. This dichroic mirror reflects light at a wavelength of the TIRF laser. The dichroic mirror allows light from the sample being imaged from the confocal laser to not be reflected and to pass through the dichroic mirror D'. The optical path of the light from the confocal laser R from the sample on the sample stage I is through a bandpass filter B and then to a detector in the form of an avalanche photo-diode (APD) A, which in this example is a single photon counting APD. The APD converts the light signal into an electrical signal, which is recorded by a computer (not shown). The optical path of the light from the TIRF laser Q from the sample on the sample stage I is through a bandpass filter B' and then to a detector in the form of an EMCCD camera C. The EMCCD camera converts the light signal into an electrical signal, which is recorded by the computer.

The optical microscope includes a position sensor M. The position sensor is used for Z-direction or vertical direction correction to continuously keep the sample on the sample stage I in focus continuously. The position sensor is located in an optical path to detect light from the TIRF laser Q back reflected from the sample on the sample stage I, through the objective lens H, through the dichroic mirror D and then reflected by the dichroic mirror G that is spaced from the dichroic mirror D.

The position sensor M is in communication connection with the computer. In response to signals received from the position sensor, by processing the signals, the computer provides signals to the sample stage I to move the sample stage vertically dependent on the received light reflected from the confocal laser R. The sample stage is movable vertically with nanometer precision.

In this way, drift correction in the Z-plane is provided, and is performed in real time to keep the sample continually in focus. This is accomplished with sub-diffraction limited resolution by continuously monitoring the back reflection from the TIRF laser Q on the position sensor M and adjusting focus on the microscope objective lens H with nanometer precision.

As mentioned above, Z-direction correction is a real time correction. Wide-field images are obtained under TIRF excitation. This produces a reflected beam at the interface between the sample and the buffer above it. The position of this reflected beam is measured using position sensor M. As the sample drifts in the Z-direction, the position of the reflection changes. This change is fed back into the fast piezo-electric objective scanners K, L that re-center the reflected beam back to the original position on the position sensor. Thus, drift in z-focus is corrected.

A sample surface is located on the sample stage I. A sample or bio-analyte is located on the sample surface. The sample surface has at least one reference element or fiducial marker, in this example, a plurality of reference elements or fiducial markers. The reference elements each have a diffraction limited intensity distribution of emitted light from incident light from the TIRF microscope laser Q. As explained below, the reference elements are used to correct for drift in sample positioning with nanometer precision.

In use, the reference elements are excited by the laser Q in TIRF mode and the resulting fluorescence from the reference elements is directed towards and is collected by the EMCCD camera C, which produces an electrical signal representing this. The laser of the confocal microscope R is fast scanned for confocal laser excitation using X-axis and Y-axis laser scanners (K and L respectively). The laser light is incident on the sample on the sample surface on the sample stage I and the fluorescence from the sample is directed to the single photon counting APD A.

A computer connected to the EMCCD camera C generates a super-resolution constellation map for every frame in the data collection from the electrical signal. The super-resolution constellation of these reference elements or markers is used to triangulate the exact position of the sample or bio-analyte in a confocal image obtained with the fast laser scanning. In other words, multiple points are triangulated using wide field TIRF microscopy, and then reconstructed back to their original positions, frame-by-frame, using these triangulated points to also correct the additional, simultaneously acquired, confocal image.

The diameter of the active area of the APD A, the numerical aperture of the objective lens H, scan angles from the laser scanners K,L, and tube lens E, determine the region of interest (ROI) and may be adjusted for different applications as explained further below. In this configuration, all photons are collected by the APD without dead-time between frames. This allows for stochastic kinetic measurements. The spatial position of all of the collected photons are spatially tagged. That is to say, correlated to the laser scan position and recorded. In this example, this is accomplished through a fast computer interface. However, an FPGA may be used alternatively for enhanced time resolution.

The fast acousto-optic laser scanners (or galvanometers) K,L are used to scan samples and identify regions of interest via automated positioning by the laser scanners quickly scanning an ROI to find biomarkers of interest that are dispersed spatially throughout a sample. When a biomarker is identified by a user, the laser scanners may be directed to this exact position and spectrally interrogated for an amount of time set by the user.

In addition to the frame-by-frame correction described above, temperature stabilization is used (to reduce thermal noise), low thermal drift materials (for example, invar steel, that has a low coefficient of expansion, and hence low temperature-dependent movement, described in more detail below), and active vibration isolation technology are used to reduce the overall drift in the microscope (to below the diffraction limit of around 200 nm or ~200 nm).

The automated temperature cycling that is used to promote immobilisation makes use of the known characteristic of a lipid membrane as it is cooled as described in Kumud R. Poudel, David J. Keller and James A. Brozik 2012. The effect of a phase transition on single molecule tracks of Annexin V in cushioned DMPC assemblies. Soft Matter 8; 11285. A lipid membrane transitions from a homogeneous liquid crystalline phase (L$\alpha$), through a two-phase (L$\alpha$+gel-phase-P$\beta'$) and to a gel-phase (P$\beta'$) in which the lateral diffusion of membrane proteins is confined and the receptor is immobilised (that is to say, stationary).

Even though this is outstanding stability, it can be greatly enhanced (to as low as, for example, 1.5 nm) using post-processing imaging correction. This takes the form of frame-by-frame recording of the time trace of the fiducial constellation described above and frame by frame enhancement of the confocal images collected simultaneously with the wide-field images.

In this way, simultaneously, super-resolution confocal imaging, super-resolution wide-field imaging, photon-by-photon spatial-tagging, and the time-tagging of collected photons are carried out. Software algorithms use the data gathered from this optical microscope to reconstruct super-resolution images. Automated confocal laser scanning of the sample or bio-analyte accounts for positional movements within the sample and identifies regions of interest that are interrogated at higher spatial and temporal resolution via an automated computational process. Subsequent frame-to-frame drift correction and imaging processing provides a means to interrogate the kinetic properties of single molecules and or proteins over very long period of time (more than 24 hours if needed) leading to a high level of statistical confidence.

Figure 2:
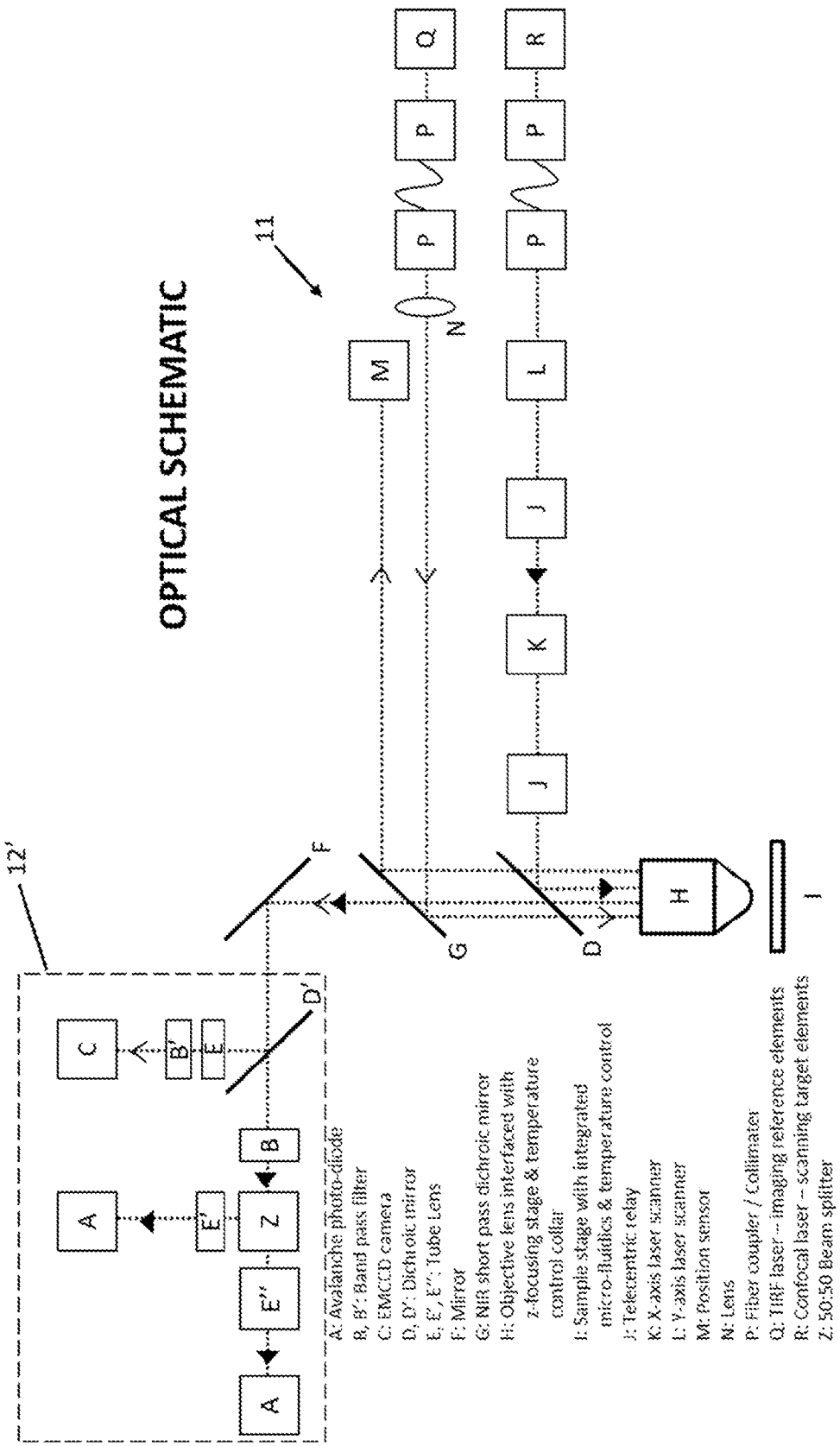
FIG. 2 is a schematic drawing of another optical microscope embodying an aspect of the present invention.

Another example optical microscope 11 is illustrated in FIG. 2. It is similar in most respects to the optical microscope 10 of FIG. 1 and like features have been given like reference numerals. The optical microscope of FIG. 2 differs from the optical microscope of FIG. 1 by its detection portion 12' instead of the detection portion 12 of FIG. 1.

In the detection portion 12' of FIG. 2, the optical path from mirror F is directly to dichroic mirror D'. The dichroic mirror is parallel to the mirror F. In other words, the dichroic mirror is at 45° to the optical path. This dichroic mirror reflects light at a wavelength of the TIRF laser Q. The dichroic mirror allows light from the sample being imaged from the confocal laser R to not be reflected and to pass through the dichroic mirror D'.

The optical path of the light from the confocal laser R from the sample on the sample stage I is through a bandpass filter B and then to a beam splitter in the form of a 50:50 beam splitter Z. The 50:50 beam splitter splits the single beam in to two different beams of the same power. The optical path of each of these beams is to a different detector each in the form of an APD A, which in this example are single photon counting APDs. As in the example of FIG. 1, the APDs convert the light signal into an electrical signal, which is recorded by a computer (not shown).

The optical path of the light from the TIRF laser Q from the sample on the sample stage I is through a tube lens E, then through a bandpass filter B' and then to a detector in the form of an EMCCD camera C. The EMCCD camera converts the light signal into an electrical signal, which is recorded by the computer.

The addition of the 50:50 beam splitter and the second APD of the example of FIG. 2 are significant. They allow for resolution below the diffraction limit in the Z-plane to be accomplished. The focal planes of both of the APDs A of FIG. 2 are set at unique calibrated focal planes within the axial confocal volume of the optical microscope 11 and the Z-localization of point emitters are determined by comparison of the point spread in each plane. The use of two APDs as described in this example results in a second image plane that sets a diffraction limit apart from the first image plane. By monitoring the fluorescence intensity at both planes, a particle may be located between them, thus achieving super-resolution in the Z-axis. Refinement of the Z-plane is further refined by Z-piezo objective scanning with nanometer positional accuracy.

An example optical microscopy housing 18 will now be described with reference to FIGS. 3, 4 and 5. The optical microscopy sample housing or chamber includes the objective lens H of FIGS. 1 and 2 and the sample stage or sample chamber I, which is formed by a lid 20, an optics chamber 22 and a sample chamber 24 of FIG. 3.

The imaging stage provides an environment that is both thermally and vibrationally stable, and contains integrated channels that enable the microfluidic application of buffers and test compounds to the sample or bio-analyte.

Figure 3:
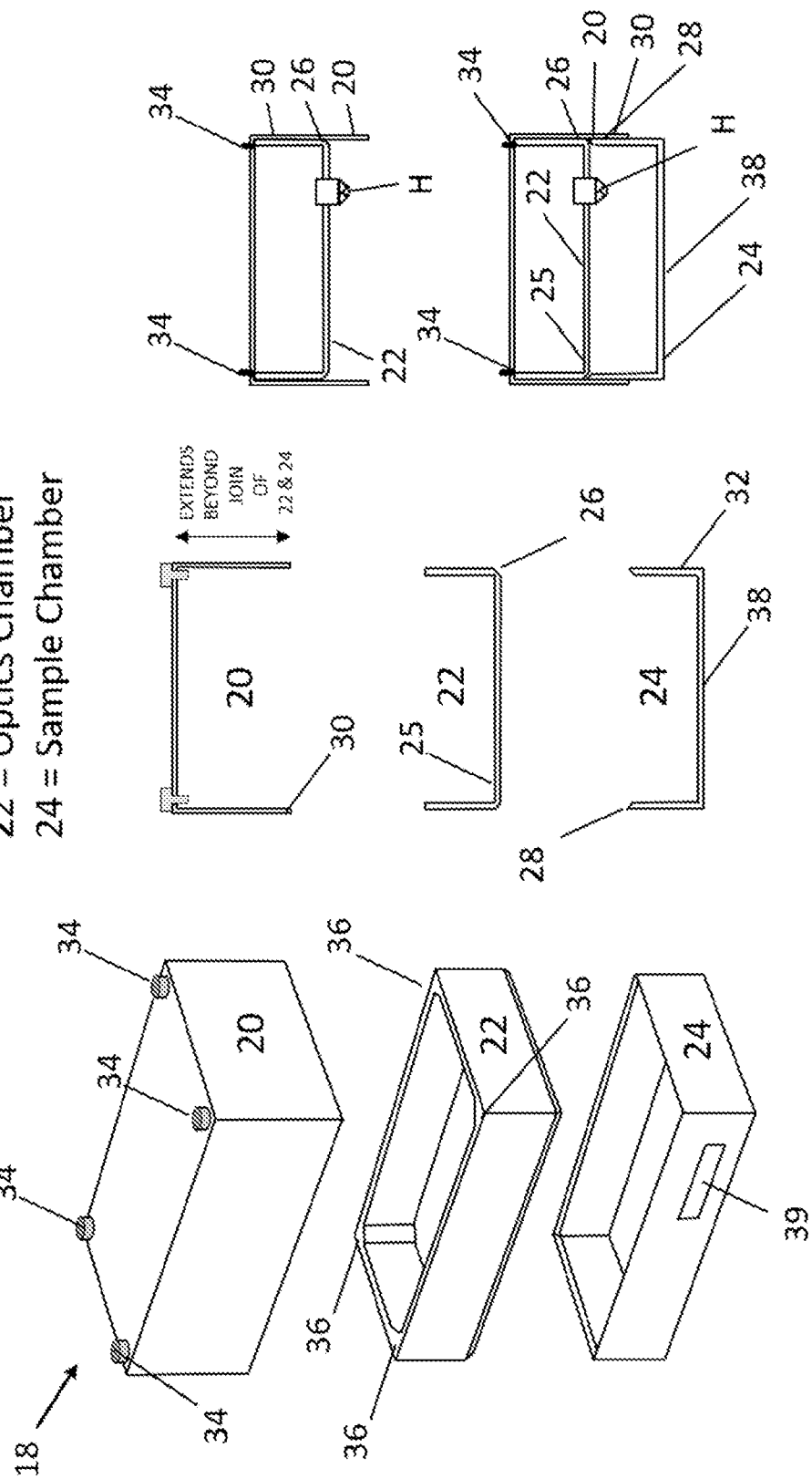
FIG. 3 is a schematic drawing of an optical microscopy sample housing or chamber embodying an aspect of the present invention.

Referring first to FIG. 3, broadly, the optical microscope housing includes an optical microscopy sample enclosure, sample chamber or sample housing 24 for housing a sample for optical microscopy. The sample chamber is made of metal and in particular steel, and in this example, Invar. The sample chamber includes a sample access port 39 on one side and towards one end. It also includes an optics chamber housing or optic chamber 22 that is located on the sample chamber 24. The optics chamber houses a portion of the optical microscope in the form of objective lens H. The objective lens focuses and positions light from the optical microscope on to a sample in the sample chamber. Each of the sample chamber and optics chamber are an open box of rectangular cross section with the same maximum length and maximum width. The base 25 of the box forming the optics chamber includes the objective lens H. The objective lens projects outwardly from the interior and through the base 25 of the optics chamber. The objective lens H is located towards one side of the base 25. A rectangular lid 20 is provided to cover the optics chamber 20.

The sample chamber 24 and the optics chamber 22 comprise locating means in the form of complementary features 26,28,30 that locate the optics chamber on the sample chamber. In the example of FIG. 3, the complementary features take the form of complementary abutting bevelled edges on: the external outer perimeter of the base 25 of the optics chamber (bevelled edges 26); and top edges of side walls 32 projecting from a base 38 of the sample chamber 24 (bevelled edges 28). The bevelled edges 26 increase the width of the base as they extend from the outside of the base inwardly. The complementary bevelled edges 28 increase the height of the side walls as they extend from the inside outwardly. Complementary features also include projecting portions or sidewalls 30 of lid 20 to project over the interface formed by the abutting bevelled edges 26,28 between the optics chamber and the sample chamber.

The rectangular lid 20 includes bolts 34 located at each corner. The optics chamber 22 includes a threaded hole 36 at each corner. The bolts are screwed into the threaded holes in order to secure the lid to the optics chamber.

Figure 4:
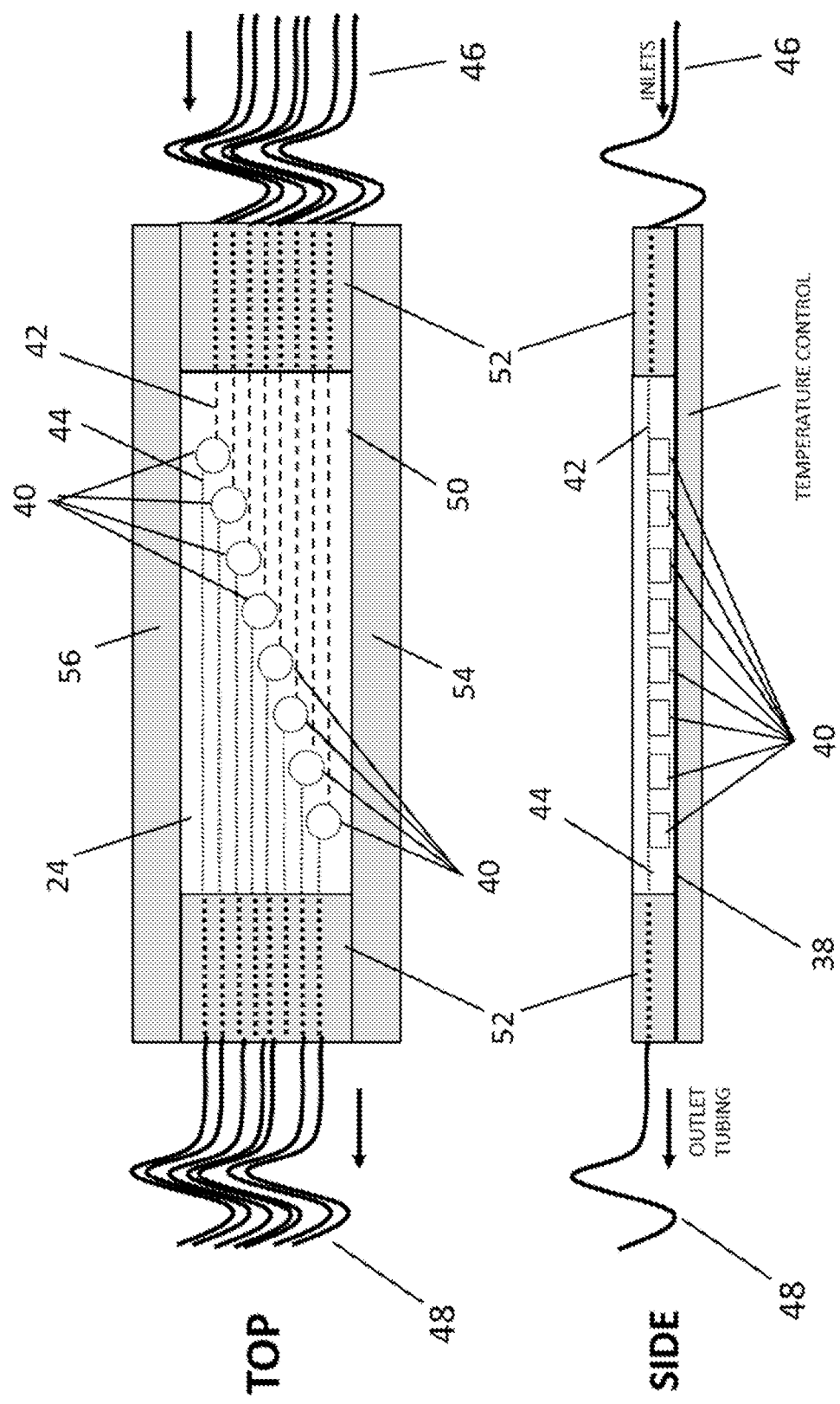
FIG. 4 is a schematic drawing of a portion of the optical microscopy sample housing or chamber of FIG. 3.

The sample chamber 24 or flow chamber is illustrated in more detail in FIG. 4. FIG. 4 includes a top view of the sample chamber marked TOP and a view of the side marked SIDE.

The base 38 of the sample chamber 24 includes a depression, in this example eight depressions 40, configured to locate a sample (not shown). The depressions each have an inlet channel 42 and an outlet channel 44 (only one inlet and outlet channel are labelled in FIG. 4 for clarity). The base is temperature controlled. In use, fluid or liquid enters a depression through its inlet channel passes over a sample in the depression and leaves the depression through its outlet channel. A tube or tubing 46 is connected to each inlet channel. A tube or tubing 48 is connected to each outlet channel. The inlet channel and the outlet channel are offset from one another, and in this example horizontally offset, at the depression.

The edge of the base 38 includes metal, such as steel, for example, steel with a low coefficient of thermal expansion, such as Invar or Invar steel. The steel is located around the base except in a cover or viewing portion 50 for viewing the sample in each of the depressions. The cover is transparent to light for super resolution optical microscopy. It is made from glass in this example. The metal portion takes the form of a clamp or Invar clamp 52 at the ends and a front stop or Invar front stop 54 and back stop or Invar back stop 56 at the sides. The depressions 40, inlet channels 432 and outlet channels 44 are etched into the base 38. Significantly, the cover is spaced from the base forming a space for fluid or liquid in which to locate the sample, and to form a cover-fluid or cover-liquid interface. Invar is important to keep the innate thermal drift small and the density of the material helps with mechanical isolation from the environment.

Referring now to FIG. 5, the sample chamber 24 or imaging stage may have 1 or 2 to 12 or more depressions 40, such as illustrated in FIG. 5, 1, 2, 8 or 12 depressions. For 1 depression, the depression is located centrally. For 2 depressions, the depressions are located in the same position longitudinally, but spaced apart transversally. For 1 and 2 depressions 40, the inlet channels 46 and outlet channels 48 face one another. For 8 and 12 depressions 40, the depressions are located diagonally across the base 38 of the sample chamber. The inlet channels 46 and outlet channels 48 of each depression 40 are horizontally offset from one another.

Figure 6:
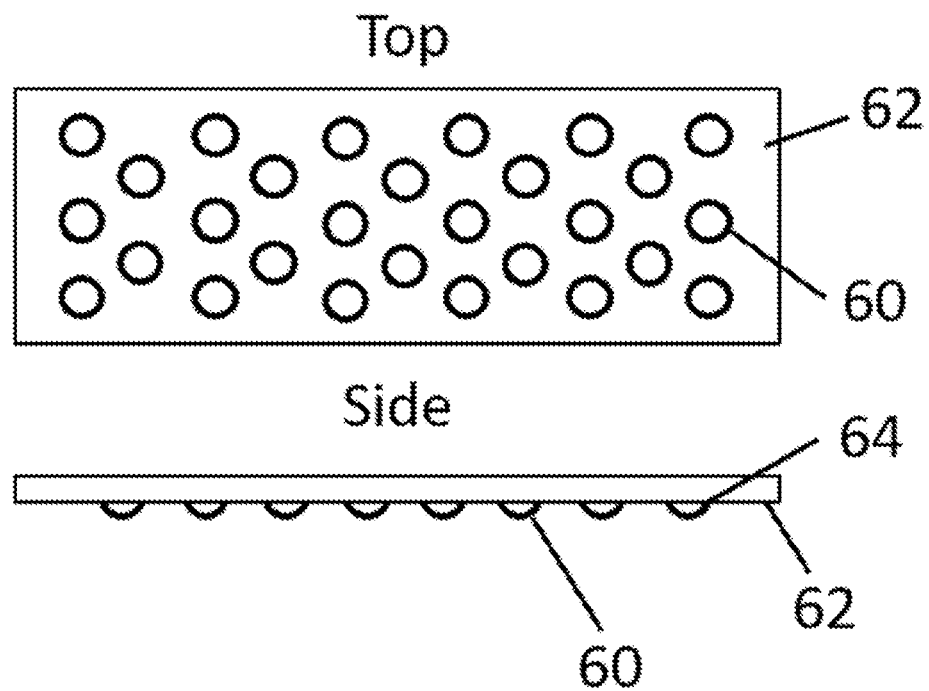
FIG. 6 is a schematic diagram of a portion of an alternative optical microscopy sample housing embodying an aspect of the present invention.

An alternative sample chamber to that of FIG. 5 is illustrated in FIG. 6 (only part of the chamber is illustrated in FIG. 6). It is a hanging-drop sample chamber. FIG. 6 includes a view from the top and a view from the side. In this chamber, fluid or liquid drops 60 (only one drop is shown with a reference numeral in FIG. 6 for clarity) including a sample to be imaged, hang from the inner surface of a cover or slide 62. The cover is transparent to light for super resolution optical microscopy. Thus, a cover-fluid or cover-liquid interface 64 is formed (indicated only in the side view). The cover is spaced from a base (not shown in FIG. 6). This catches any falling drops and prevents loss of any drops.

The drops may be of a volume on the μl scale, such as 1 μl. There may be 10 to 30 or in some examples more than 30 hanging drops. For example, there may be 100 s of drops, particularly very small fluid drops in the same physical space. Drops may be attached using an acoustic droplet ejector (ADE), such as an Echo (registered trade mark) ADE available from Labcyte Inc., San Jose, California, US.

Figure 7:
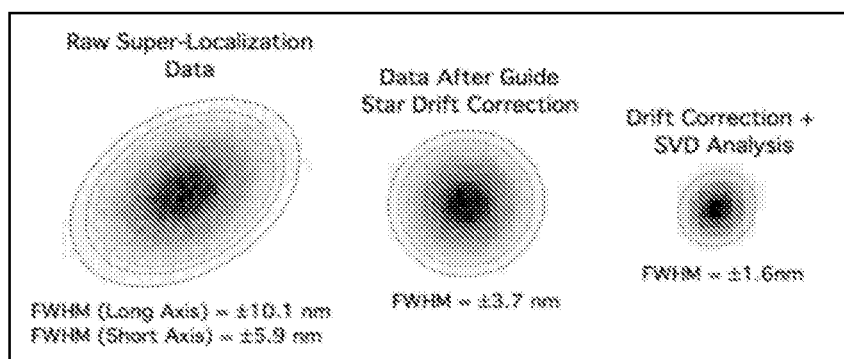
FIG. 7 is a schematic diagram illustrating the improved resolution provided by the optical microscope of FIG. 2.

FIG. 7 illustrates the improved resolution using the arrangement of FIG. 2 described above. The images shown were generated through a point spread reconstruction from individual frames of the data collection. The left image is the raw reconstruction, the middle image corrects for sample drift using fiducial markers, and the right image is reconstructed from data that was both drift corrected and filtered using single value decomposition (SVD).

FIG. 7 shows a raw reconstruction (on the left side of FIG. 7) from a target element without the frame-to-frame drift correction described above showing a full width half maximum (FWHM) and therefore, resolution, in the long axis of ±10.1 nm and FWHM and, therefore, resolution, in the short axis of ±5.9 nm. As illustrated in the middle of FIG. 7, after correction, using the frame-to-frame drift correction using fiducial markers described above, a FWHM and, therefore, resolution, of ±3.7 nm is demonstrated. This is yet further improved, as illustrated on the right side of FIG. 7, by both drift correcting as in the middle image, but also filtering using singular value decomposition (SVD) on the frame-to-frame drift corrected result. This is also illustrated in the example of FIG. 7, which illustrates a FWHM and, therefore, resolution, of ±1.6 nm.

Figure 8:
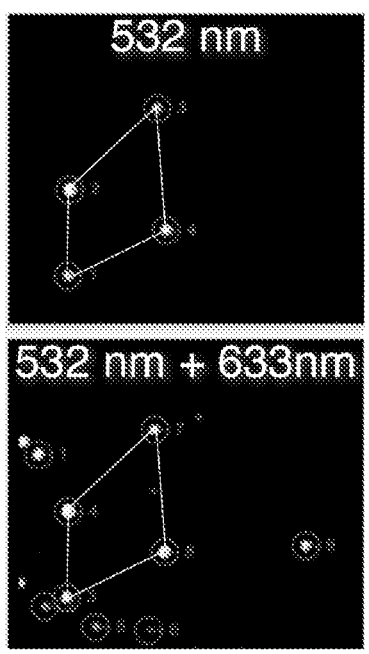
FIG. 8 is a schematic diagram illustrating the a method carried out by the optical microscope of FIG. 2.

FIG. 8 shows, at A, an image showing triangulation of reference elements at an excitation wavelength of 532 nm of the TIRF laser (TIRF laser Q in FIG. 2) and, at B, an overlay of the target signal at an excitation wavelength of 633 nm of the confocal laser (confocal laser R of FIG. 2). The top image, at A, is a frame within the data set in which a 532 nm laser (the TIRF laser Q in FIG. 2) solely excites the fiducial markers allowing for the markers to be identified and drift correction to be subsequently made. The bottom image, at B, is when both the 532 nm laser and a 632 nm laser (the confocal laser R of FIG. 2) illuminate the sample. The 632 nm excites a near IR (infrared) probe that is conjugated to ATP, a ligand that binds to individual P2X1 receptors. As shown, when both lasers are used, fiducial markers and fluorescent-ATP (the target markers) are simultaneously imaged.

Figure 9:
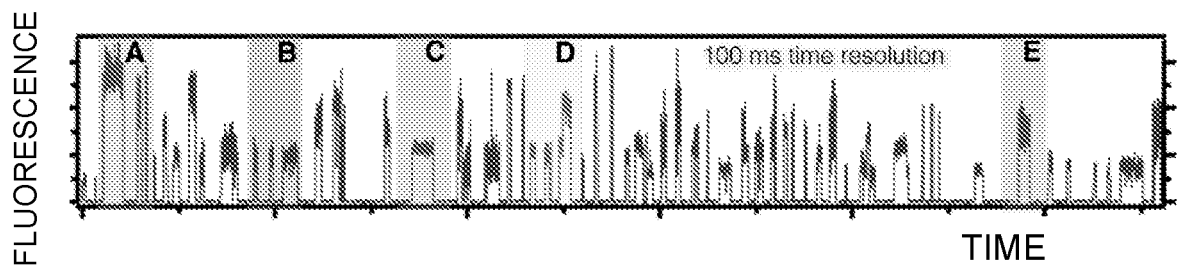
FIG. 9 is an image of single molecule interactions from the optical microscope of FIG. 2.

FIG. 9 is an image of single molecule interactions from the optical microscope of FIG. 2. It is a graph of fluorescence versus time. Time is at 100 ms resolution. FIG. 9 shows time traces of fluorescent-ATP ligand bound to individual P2X1 receptors. Data is captured as a single movie or moving image and the measured levels of fluorescence of individual, spatially-separated P2X1 receptors (such as those shown in FIG. 8) are displayed as a time trace, with each individual P2X1 receptor recorded in this example highlighted by the letters A-E. The residence times of ATP on these individual receptors yields kinetic information.

The following describes methods of using the optical microscope, an optical microscopy sample enclosure, and sample surface described above.

P2X1 receptors are used to demonstrate the use of reference elements and target elements to make super-resolution measurements of drug-receptor interactions.

P2X1 receptors are a helpful tool to demonstrate single molecule imaging as they can be purified as functional receptors, reconstituted into artificial bilayers and are targeted by a range of fluorescent agonists with suitable affinities, and have three identical binding sites separated by ~4 nm. This enables super-resolution observations of ligand-receptor interactions with a temporal and spatial resolution that has not previously been reported. This relies upon an innovation that allows frame-to-frame image stabilisation using elements that have been directly embedded into a biomimetic membrane and/or a solid support and a method of computational analysis.

Materials: Lipids were purchased from Avanti Polar Lipids, Inc. 2'/3'-O-(2-Aminoethyl-carbamoyl)-Adenosine-5'-triphosphate, labelled with ATTO-700 (ATP*) was purchased from Jena Bioscience. Buffers were purchased from Sigma-Aldrich Co. ATTO-700-DPPE (DPPE=1,2-dipalmitoyl-sn-glycero-3-phosphoethanolamine) was purchased from ATTO-TEC (GmbH)

Plasmids: A FLAG-tagged human P2X1 subunit construct was generated by fusion PCR, and cloned together with an IRES-IFP1.4 fusion PCR product as a three-point ligation into the MluI/SpeI digested pLV-T backbone (see Shu, X.; Royant, A.; Lin, M. Z.; Aguilera, T. A.; Lev-Ram, V.; Steinbach, P. A.; Tsien, R. Y. Science 2009, 324, 804; and Marquis, J.; Kampfer, S. S.; Angehrn, L.; Schumperli, D. Gene therapy 2009, 16, 70.)

The bicistronic mRNA expressed from the EF1alpha promoter codes for a c-terminal FLAG-tagged P2X1 protein and IFP1.4. The pLV-tTR-Krab-Blast vector was created by exchanging the IRES-dsRed cassette from pLV-tTR-Krab-dsRed with an IRES-Blasticidin expression cassette. All constructs were verified by DNA sequencing.

Cell lines: HEK293T cells were transduced with pLV-tTR-Krab-Blast to create the HEK 293-tTR-Krab-Blast cell line, and after selection of transduced cells with Blasticidin, were transduced with pLV-P2X1-IRES.IFP1.4 to create the inducible P2X1-FLAG-IRES-IFP1.4 cell line.

Virus Production: FuGene HD (Promega, WI, USA) was used to transfect HEK 293T cells with pLV-tTR-Krab Blast and pLV-P2X1-FLAG-IRES-IFP1.4 respectively, along with pCMVΔR8.91 and pMD2.G according to established methods (see Wiznerowicz, M.; Trono, D. J. Virol. 2003, 77, 8957). Lentiviral supernatants were collected 48, 72 and 96 h post transfection and filtered through a 0.45 μM polyethersulfone sterile filter (Millipore Corp, MA, USA). For transduction, HEK 293T cells were incubated with lentiviral supernatants supplemented with 5 μg mL$^{-1}$ polybrene (hexadimethrine bromide, Sigma Aldrich St. Louis, MO, USA). After 7 hours, polybrene was diluted to 2.5 μg mL$^{-1}$ by the addition of fresh DMEM/10% FBS, and the procedure was repeated for two days.

After expansion of the double transduced cells, doxycycline and biliverdine were added to the medium for 48 hours, and highly IFP1.4 positive cells were collected by fluorescence-activated cell sorting (FACS) to yield a highly-transduced cell pool. High level expression was further optimized by generating a clonal cell line. This was achieved by visual inspection of Alexa-647-ATP binding using confocal microscopy of live cells visualised in phosphate buffered saline (PBS (mM); 0.1 NaCl, 2.0 Na$_2$HPO$_4$, 0.54 KCl, 0.4 KH$_2$PO$_4$, pH 7.4) using a FV300 laser-scanning confocal microscope with an Olympus UplanFLN 40×NA1.30 oil immersion objective and a 60 μm confocal aperture.

Protein Purification: HEK 293T cells stably expressing the FLAG-P2X1 receptor were grown as monolayers in T300 plates. At a density of 80%, cells were washed once with phosphate buffered saline (PBS (mM); 0.1 NaCl, 2.0 Na$_2$HPO$_4$, 0.54 KCl, 0.4 KH$_2$PO$_4$, pH 7.4), mechanically detached into PBS, collected by centrifugation at 500 g for 5 min, snap frozen in liquid N$_2$ and stored at −70° C. until needed. After defrosting, cells were diluted with 2 mL Tris-EDTA (50 mM Tris-HCl, 0.5 mM EDTA, pH 7.5) containing Halt Protease Inhibitor (Pierce, Thermo Scientific, IL, USA) and homogenized with a 5 mL cell-douncer, followed by trituration through 21-gauge and 27-gauge needles. Soluble proteins were removed by centrifugation at 100,000 g for 30 min, and the membrane fraction dissolved in 10 mL PBS+2 mM C12E9, before being incubated head-over-tail for 1 h at 4° C.; a concentration of the micelle forming polyether that is higher than the critical micelle concentration (see Privé, G. G. Methods 2007, 41, 388). Insoluble fractions were removed by centrifugation at 100,000 g for 1 h and the supernatant incubated with anti-FLAG M2 agarose beads (Sigma Aldrich), head-over-tail for 2 h at 4° C. Bound beads were washed 5× with PBS+2 mM C12E9 and protein recovered by incubating with 250 µL PBS+0.4 mM C12E9 supplemented with 1 mg mL$^{-1}$ FLAG peptide (Pepnome Ltd, Zhuhai, China) for 30 min. The eluate was recovered by centrifugation of the suspension through Micro Bio-Spin columns (Bio-Rad, California, USA) at 500 g for 1 min. This was dialyzed with a 10 K MWCO Slide-A-Lyzer (Thermo Scientific, Waltham, MA, USA) overnight in PBS+ 0.4 mM C12E9, aliquoted, snap frozen in liquid N$_2$ and stored at −70° C.

Protein Purity & Quantification: To determine purity and yield of P2X1 receptors from transfected HEK 293 cells, 20 µL of the eluate and pepsin standards were subjected to SDS-Page on a 4-12% NuPAGE Novex Bis-Tris gel (Life Technologies), followed by colloidal Coomassie staining, imaging and quantification using a LI-COR Odyssey infrared system (LI-COR Biosystems, NE, USA). To verify the results of Coomassie staining, samples were subjected to amino acid analysis using HPLC (column Novapack C18, 60 Å, 3.9×150 mm) after hydrolysis in 6 M HCl.

For Western blotting, proteins were transferred to a 0.22 µm nitrocellulose membrane using the iBlot Dry Blotting System (Invitrogen, CA, USA). Membranes were blocked for 1 h hour in TBS (50 mM Tris-Cl, 150 mM NaCl, pH 7.5) containing 0.1% Tween-20 and 5% skimmed milk powder, before incubating with the 1° antibodies goat anti-FLAG (1:3000, Bethyl Laboratories; 2° antibody donkey anti-goat IRDye800 (1:10,000, Li-Cor Biosystems) in TBS-tween-milk overnight at 4° C. Membranes were washed 5× for 5 min each with TBS-tween and incubated for 2 h at room temp with the 2o antibodies donkey anti-goat IRDye800 (1:10,000, Li-Cor) and donkey anti-mouse IRDye680 (1:10,000, LI-COR) in TBS-tween-milk at room temp. After 5× washes with TBS-tween, membranes were scanned using the Odyssey Imaging System (LI-COR).

Vesicle Preparation: Three types of small unilamellar vesicles (SUVs) were prepared: (1) SUVs used in the P2X1 experiments (P2X1-liposomes), (2) SUVs used in the characterization of the ATTO-700 probe molecule (DPPC-liposomes), and (3) SUVs for FRAP experiments (FRAP-liposomes). P2X1-liposomes were prepared from lipid cakes made by evaporating 1 mL of a 9:1 chloroform:methanol solution that contained 3.93 µmol of 1,2-dimyristoyl-sn-glycero-3-phos-phocholine (DMPC; Avanti Polar Lipids), 0.07 µmol of 1,2-dioleoyl-sn-glycero-3-phosphoetha-nolamine-N-[methoxy(poly-ethyleneglycol)-2000] (ammonium salt) (PEG-PE; Avanti Polar Lipids), and 1 µmol of L-a-lysophosphatidyl-serine (Brain-PS). FRAP-liposomes were the same as the P2X1-liposomes except the lipid cakes also contained 0.005 µmol of 1,2-dimyristoyl-sn-glycero-3-phosphoethanolamine-N-(lissamine rhodamine B sulfonyl) (ammonium salt) (Rhodamine-DMPE). DPPC-liposomes were prepared from lipid cakes made by evaporating 1 mL of a 9:1 chloroform:methanol solution that contained 5 µmol of 1,2-dipalmitoyl-sn-glycero-3-phosphocholine (DPPC). Next, LMVs (large multilamellar vesicles) were formed by hydrating the lipid cakes in 1 mL of 100 mM HEPES buffer (pH 7.4) containing 5 mM CaCl$_2$, and 140 mM NaCl (named "HEPES buffer" throughout this text). The suspension of LMVs was placed in a bath sonicator at 60° C. for 30 minutes upon which the turbid solution became translucent, indicating the formation of SUVs. The solution containing the SUVs was centrifuged for 30 minutes at 100,000×g and the supernatant (containing the SUVs) was transferred to a 1 mL Eppendorf tube and used the same day or immediately frozen in liquid N2 and stored at −80° C.

Proteoliposome Preparation: Proteoliposomes were prepared by placing a 1 mL aliquot of the P2X1-liposomes in a water bath at 35° C. Next, 24 mM nonaethylene glycol monododecyl ether (C12E9, Fluka) in HEPES buffer was added in 6× 14.4 µL aliquots at 10-minute intervals with gentle agitation after each addition. After the final addition of C12E9, 2.5 µL of 166 µg/mL P2X1 in PBS 0.4 mM C12E9 (final concentration ~3 nM P2X1) was added and the SUV protein solution was incubated for 1 hour at 35° C., after which the solution was incubated for another 2 h on a nutating mixer at 4° C. After incubation the solution was transferred to a 50 kDa cutoff dialysis cassette (Tube-O-DIALYZER, GBiosciences) and floated in 800 mL of HEPES buffer with 1 mL of SM2 BioBead slurry (BioRad) at 4° C. The buffer was exchanged 4 times at 4-hour intervals. Finally, 5 µL of 1 M trehalose in HEPES buffer was added to the final proteoliposome solution to make the final concentration 5 mM in trehalose. The solution was divided into aliquots, flash frozen in liquid N2, and stored at −80° C. until use.

Lipid Bilayers Formation: All membranes were formed on 25 mm round hydrophilically treated borosilicate glass coverslips that were heated at 80° C. for 45 minutes in a solution of water, concentrated nitric acid, and 30% hydrogen peroxide (1:1:1 by volume). The coverslips were then rinsed with a copious amount of purified water and dried under a gentle stream of pre-purified nitrogen. A single coverslip was then placed onto a sample holder and fitted with a parafilm® gasket containing an 8 mm hole cut into its center. For bilayers containing P2X1, proteoliposomes were diluted by 50% with the protein free P2X1-liposomes. Next, a 50 µL aliquot of the appropriate SUV solution was placed in the center hole and allowed to incubate at room temperature for 40 min during which the SUVs fuse to the glass substrate, ruptured, and formed a continuous bilayer. Bilayers made from DPPC-liposomes were incubated at 45° C. for 2 h (the liquid-to-gel phase transition of DPPC is 41° C.). After incubation, the SUV solution was carefully removed and the solid supported lipid bilayer membrane was gently rinsed 6× with HEPES buffer. Bilayers containing PEG-PE formed a cushion between the lipid membrane and the solid glass substrate. In these bilayers, the concentration of PEG-PE was 1.4 mole percent and the PEG is in an intermediate phase between its brush and mushroom phases. Cremer and co-worker have shown that this is the optimal condition that minimizes protein interactions with the underlying substrate without interfering with protein mobility (see Diaz, A. J.; Albertorio, F.; Daniel, S.; Cremer, P. S. Langmuir 2008, 24, 6820; and Albertorio, F.; Diaz, A. J.; Yang, T.; Chapa, V. A.; Kataoka, S.; Castellana, E. T.; Cremer, P. S. Langmuir 2005, 21, 7476.).

Fluorescence Recovery After Photobleaching: Fluorescence recovery after photobleaching (FRAP) was used to measure the lateral diffusion of labelled lipids in the membrane and to determine the liquid-to-gel phase transition temperature of the P2X1-lipid bilayer. In this experiment, an Olympus IX71 microscope was used and a small well-defined area of fluorescently labelled lipids was photobleached using two-photons from a Spectra-Physics femtosecond Ti:Sapphire laser tuned to 780 nm (Mia-Tia; 100 MHz repetition rate, 80 fs FWHM pulse widths). The advantages of the two-photon technique are that the bleach area is very small and bleaching occurs rapidly (limited only by the shutter speed, which was 1 ms in our work) (see Kubitscheck, U.; Tschodrich Rotter, M.; Wedekind, P.; Peters, R. Journal of Microscopy-Oxford 1996, 182, 225; and Poudel, K. R.; Keller, D. J.; Brozik, J. A. Soft Matter 2012, 8, 11285.). The FRAP recovery was measured using a Hg:Xe arc lamp that was passed through an optical shutter, a 555 nm bandpass filter (25 nm FWHM; Chroma Technologies Corp), and directed to a 1.4 N/A apochromatic 100× microscope objective (Olympus, Inc.) with a dichroic mirror (U-N86016; Chroma Technologies Corp). The laser was passed through a fast optical shutter (model LASSH-U_PSFIB; Olympus Inc.) and directed into the microscope objective with a second dichroic mirror (FF749-SDi01; Semrock, Inc.). The laser was attenuated such that the initial bleached area was ~70% of the original fluorescent intensity and Gaussian in shape (FWHM=1.2 µm and the average power was ~30 mW). The fluorescence was collected by the objective, passed through both dichroic mirrors, then through a 605 nm bandpass filter (40 nm FWHM; Chroma Technologies Corp) and imaged onto a Hamamatsu ORCA II CCD camera. The optical shutters were synchronized and data acquisition was achieved with a custom script written within the Advanced Metamorph software suite (Olympus Inc.). Temperature control was achieved with a custom-made sample cell and objective collar in order to match and maintain the temperature at the sample and at the microscope objective. In this experimental design, two identical PID temperature controllers were utilized (Model SYL-1512A2; Auber Instruments Inc) and the temperature was monitored with matching Pt temperature sensors (Model TH100PT; Thorlabs Inc.). Data analysis was performed using a combination of the Advanced Metamorph software suite (Olympus, Inc.), IGOR 6.37 pro, and MATLAB (Mathworks Inc.).

To calculate the lateral diffusion coefficients associated with the recovery of the labelled lipids, equation 1 was utilised (see Axelrod, D.; Koppel, D.; Schlessinger, J.; Elson, E.; Webb, W. Biophysical journal 1976, 16, 1055):

$$D = \left(\frac{\omega^2}{4t_{1/2}}\right)\gamma_D \quad (1)$$

where ω is the FWHM of the Gaussian profile of the photobleached area generated immediately after exposure to the FRAP laser, $t^{1/2}$ is the time required for the photobleached spot to recover to ½ its maximum value, and γD is a correction factor that depends on the bleach time and the shape of the bleach area. The value of γD was 1 for our experiments. Raw 'gray scale' data was used to determine the percent recoveries.

Optical Setup of Single Molecule Microscope: Stochastic kinetic measurements were made with a custom-built single molecule fluorescence microscope and experiments were carried out at 10° C. and 25° C. Excitation of the sample was achieved with a stabilized cw-He:Ne laser producing a 633 nm beam. The beam was first passed through a laser line filter (633/10 X; Chroma Tech.), then a ¼ waveplate (WPQ05M-633; Thorlabs, Inc.) to produce a circular polarized laser beam. The beam was focused with a 150 mm achromatic lens and directed to the far edge of a 1.45 N/A apochromatic TIRF microscope objective (Olympus Inc.) with a dichroic mirror (D-03-R635-t3; Semrock, Inc.) to produce an evanescent field at the interface between the glass coverslip and the lipid bilayer (total internal reflection; the laser power before TIR was 0.94 mW). The fluorescence from individual ATTO-700 probe molecules were collected by the microscope objective, passed through the dichroic mirror, a longpass filter (ET655lp; Chroma Tech.) and imaged onto an EMCCD camera (iXon 888; Andor Tech.) with a 300 mm achromatic lens. The exposure time was set to 50 ms and the frame rate was only slightly higher at 50.02 ms. Temperature control was maintained at the sample and the microscope objective with a custom-made sample holder and objective collar. The sample holder and objective collar were both fitted with peltiers (TEC3-2.5; Thorlabs Inc.) and interfaced to separate Meerstetter Engineering temperature controllers (model TEC-1091). The temperature was monitored at the sample with a Pt temperature sensor (TH100PT; Thorlabs Inc.) and the hot side of the peltiers with a thermistor (TH10K; Thorlabs Inc.). Single molecule tracking was performed with an automated tracking algorithm based on the work by Crocker and Grier (Crocker, J. C.; Grier, D. G. Journal of colloid and interface science 1996, 179, 298) and programmed into MATLAB (The Mathworks Inc.) using modified scripts.

Measurement of Stochastic Photoblinking/Photobleaching of ATTO-700: The photoblinking and photobleaching properties of ATTO-700 were measured by incorporating ATTO-700-DPPE into the top leaflet of preformed DPPC planar supported membranes (described above). Incorporation of ATTO-700-DPPE into the top leaflet of the bilayers ensured that the probe molecules would not interact with the underlying glass support. This was achieved by adding 60 µL of 789 pM Atto-700-DPPE in HEPES buffer to the top of the membrane followed by incubation at 45° C. for 1 hour. After incubation, the solution above the sample was carefully removed and the membrane was rinsed 6× with fresh HEPES buffer. The sample was protected from light at all steps. Next, the sample was affixed to the single molecule microscope described above and allowed to equilibrate to either 10° C. or 25° C. for at least 30 minutes. Both temperature points are below the liquid-to-gel phase transition of DPPE ensuring that ATTO-700 probe molecules remained immobile during the course of the experiments. Each time-trace was recorded on a part of the sample that had not been exposed to light by synchronizing data collection with an optical shutter. The shutter was synchronised to open with the first frame of the time-trace and remained opened until just after the last frame was collected. Each time course lasted at least 1 min, 40 s to ensure that all ATTO-700 molecules within the field of view had bleached. A total of 803 time traces for were recorded at 25° C. and 722 time traces were recorded at 10° C.

Measurement of Stochastic Binding of ATP* to P2X1: For kinetic measurements involving ATP* binding to P2X1, the buffer above the membrane containing the reconstituted receptor was gently removed, replaced with 60 µL of 100 pM ATP* in HEPES buffer, and protected from light. The sample was affixed to the single molecule microscope described above and allowed to equilibrate at either 10° C. or 25° C. for at least 30 minutes prior to data collection. Each time-trace lasted for a 1 min, 40 s and data collection was synchronized with the He:Ne laser as described above. Unlike the photoblinking and photobleaching experiments, time-traces were collected on the same area of the membrane for 10 consecutive time-traces before moving to a different area of the membrane. This allowed for the observation of repeated ATP* binding events to the same individual P2X1 receptors.

Stochastic Kinetic Analysis of ATTO-700 Photoblinking and Photobleaching: All time traces began with the probe molecule fluorescing and ended in permanent photobleaching. Photoblinking was also observed in several time traces. From these observations the molecule was initially assigned to be in either (1) a fluorescent state, (2) a photoblink state—assumed to be an excited state triplet, or (3) a permanent photobleached state. For each temperature point the experimental data was bootstrapped together using an artificial recovery rate ($k_{recovery}$=0.01 sec$^{-1}$) to generate a pseudo-ergodic data set (generated from all measured time traces). This was accomplished by generating a table of recovery times using exact stochastic rate equations and a total of 400 individual simulations (see Gillespie, D., T. Journal of Physical Chemistry 1977, 81, 22). Next, each time trace was bootstrapped together by truncating each measured time trace after the final photobleaching step and inserting an artificial recovery delay between the time traces. The artificial recovery delay time was randomly selected from the recovery table generated by the simulation. Using the state assignments described above the data was analyzed using a Markov Model (MM) in which photobleaching occurred either through an excited state singlet or an excited state triplet. This generated the initial guesses for the photoblinking rate (kB), rate of recovery from the photoblinked state (k-B), and the rate of photobleaching (kb) used in a Hidden Markov Model (HMM), which connected all states through all possible kinetic paths, and rate constants were estimated using a maximum likelihood estimator. The HMM analysis made use of the observables in the data set (fluorescing and non-fluorescing) and did not make use of the state assignments described above. This allowed photobleaching to occur from both a long-lived triplet state and the fluorescing singlet state of the probe molecule—a more realistic model. The estimates for the rate constants were further refined by running the HMM analysis in a loop until convergence was observed for each rate; typically 6-7 iterations. All algorithms were scripted in MATLAB using a Baum-Welch Maximum Likelihood estimator.

Stochastic Kinetic Analysis of ATP Binding to P2X1: All kinetic rates associated with ATP* binding to P2X1 and kinetic rates intrinsic to the probe molecule were determined using HMMs, a Maximum Likelihood estimator, and a constrained M.

Mathematical Modelling: Modelling was undertaken using algorithms developed in MATLAB.

Results

Phase Characteristics of P2X1 Planar Lipid Bilayers: It is well known that the lateral diffusion within a lipid bilayer is greatly affected by its phase. This allows for the determination of transition temperatures ($T_c$) by measuring the temperature dependence of lateral diffusion using FRAP (see Tamm, L. K.; McConnell, H. M. Biophys J 1985, 47, 105.).

Figure 10:
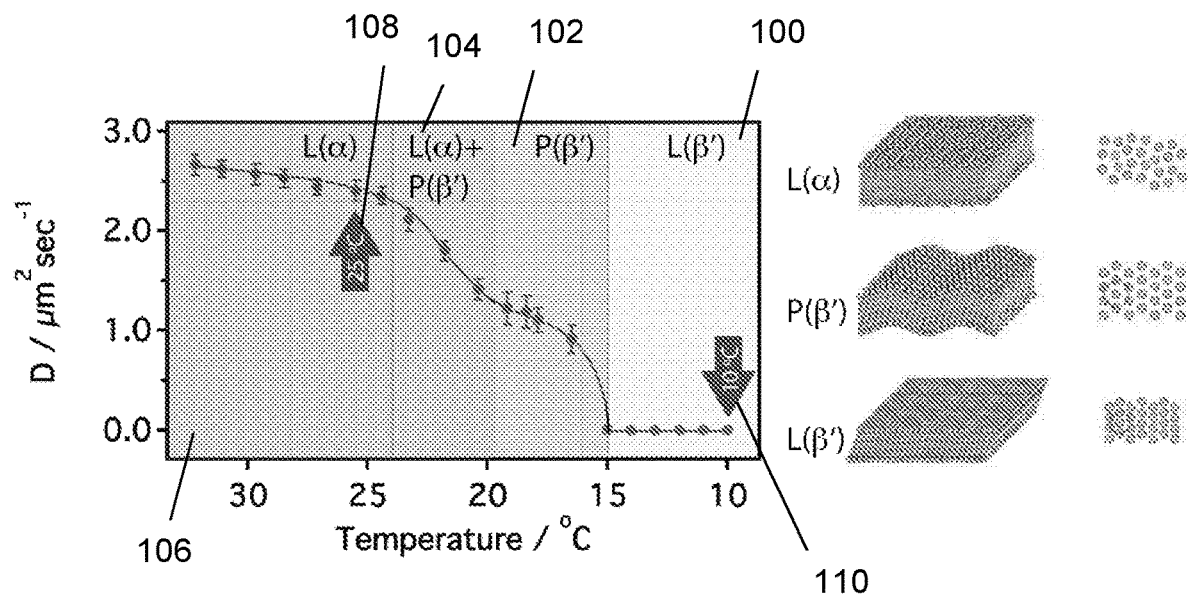
FIG. 10 is a graph of diffusion coefficients of Rhodamine-DMPE diffusing in a membrane plotted as a function of temperature obtained using the optical microscope of FIG. 2.

Depicted in FIG. 10 is a plot of membrane diffusion, D, versus temperature. FIG. 10 is a graph of diffusion coefficients of Rhodamine-DMPE diffusing in a membrane plotted as a function of temperature obtained using the optical microscope of FIG. 2. The plot defines the phases within the biomimetic membrane (liquid, mixed phase, rippled phase, and gel phase). The different phases are depicted on the right side of the graph. The right most area 100 is the temperature range in which the membrane is in its gel L($\beta$), the area 102 to the left of the right most area is the temperature range in which the membrane is in its ripple P($\beta$) phase, the area 104 to the left of area 102 is a mixed phase region, and the area 106 to the left of the area 104 is the temperature region in which the membrane exists in its liquid L($\beta$) phase. The two arrows at 25° C. and 10° C. (108, 110 respectively) indicate the temperature points where single molecule tracking studies were carried out.

Figure 12:
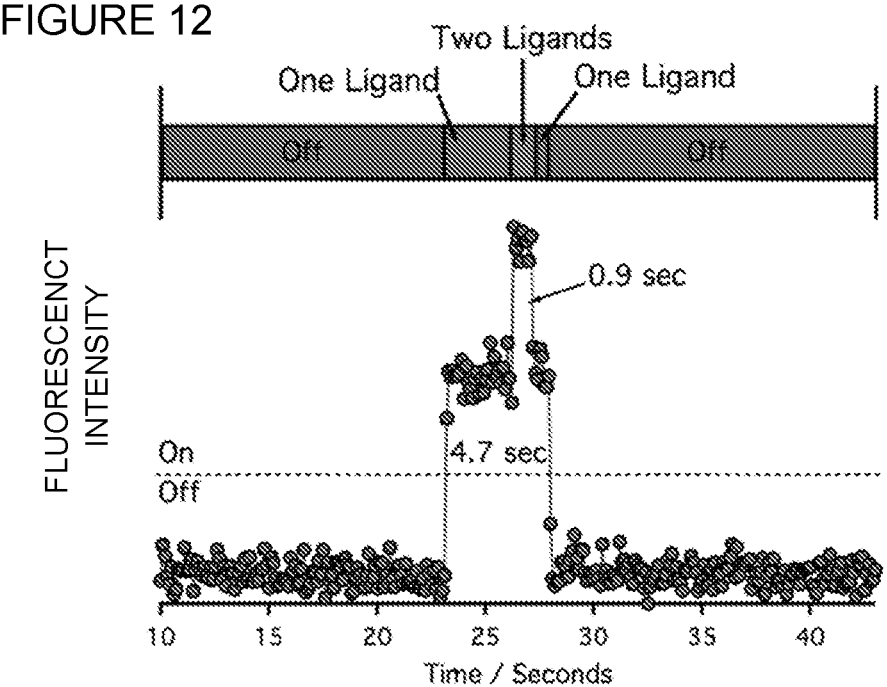
FIG. 12 is an illustration of changes in fluorescent intensity of a target element as one fluorescent ligand binds and unbinds then a second one binds followed by the sequential unbinding of the ligands from a protein.

The results for the upper temperatures in FIG. 10 are similar to those reported in an earlier study carried out from 32° C. to 18° C. on the same planar supported lipid bilayer (see Poudel, K. R.; Keller, D. J.; Brozik, J. A. Soft Matter 2012, 8, 11285). In this earlier study, the authors found that the membrane existed in a liquid crystalline L($\alpha$) phase above 24° C., is in a mixed phase between 24° C.-19° C., and is in a rippled phase P($\beta$) from 19° C.-18° C. This study extended the temperature range to 10° C. and FIG. 12 shows that $T_c$ for the transition from the ripple to gel phase (P($\beta'$)→L($\beta'$)) is at 15° C. Therefore, single molecule tracking experiments of ATP* binding to P2X1 at 25° C. were carried out in the liquid phase of the P2X1-membrane and at 10° C. it was carried out in a solid phase. As shown in the sections below, this has a dramatic effect on how ATP* binds to P2X1.

Rates of Photoblinking and Photobleaching: Photoblinking and photobleaching can be determined using proprietary algorithms based on direct measurements, photochemical rates, and photophysical dynamics.

Choice of probe: The fluorescent ATP conjugate (ATTO-700-ATP, ATP*) that we used in our study has the fluorescent dye attached via short linker to the 2'- or 3'-position of the nucleotide ribose part. The crystal structures of the zebra fish P2X4 receptor (PDB ID: 4DW1) and the human P2X3 receptor (PDB ID: 5SVK), both in complex with ATP, show that these two positions on the ribose are exposed to the solvent (see: Kawate T, Michel J C, Birdsong W T, & Gouaux E (2009). Crystal structure of the ATP-gated P2X(4) ion channel in the closed state. Nature 460: 592-598; Mansoor S E, Lu W, Oosterheert W, Shekhar M, Tajkhorshid E, & Gouaux E (2016). X-ray structures define human P2X(3) receptor gating cycle and antagonist action. Nature 538: 66-71; Ruepp M D, Brozik J A, de Esch I J, Farndale R W, Murrell-Lagnado R D, & Thompson A J (2015). A fluorescent approach for identifying P2X1 ligands. Neuropharmacology 98: 13-21.). Therefore, modification of either of these two locations of the agonist should not affect its binding. Indeed, single receptor binding data corrected for photophysical blinking and photochemical bleach give binding coefficients statistically identical to overall bulk measurements. Furthermore, we showed that that fluorescent Alexa-647-ATP, with the chemical modification at the same positions, is a potent agonist of the P2X1 receptor (Ruepp et al., 2015). We chose to use the ATTO-700 dye because of its low probability of triplet formation and small spectral overlap with fiducial markers. Similar, commercial fluorescent ligands that affect both P2X1 and other receptors are widely available.

Figure 11A:
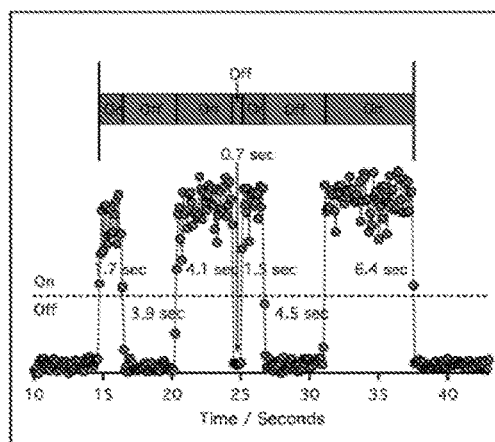
FIG. 11A illustrates an exemplary case of a fluorescent ligand binding to a membrane protein target obtained using the optical microscope of FIG. 1.
Figure 11B:
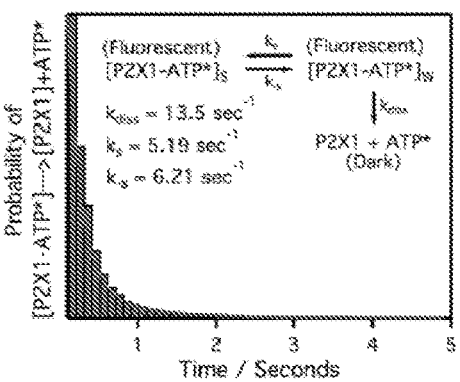
FIG. 11B illustrates a probability density function generated from many time traces of individual drug binding events (as illustrated in FIG. 11A) obtained using the optical microscope of FIG. 1.

Stoichiometry and Ligand Binding: By utilizing the image-stabilisation technique of the arrangement described above, the stoichiometry of ATP on individual P2X1 receptors was determined by analysing stepwise intensity jumps as ATP molecules bound and unbound from purified P2X1 receptors reconstituted into artificial lipid membranes. FIG. 11A illustrates an exemplary case of a fluorescent ligand binding to a membrane protein target obtained using the optical microscope of FIG. 2. FIG. 11B illustrates a probability density function generated from many time traces of individual drug binding events (as illustrated in FIG. 11A) obtained using the optical microscope of FIG. 2. FIG. 11A illustrates summary data of fluorescent ligands binding to membrane protein targets. It depicts a time trace of a fluorescent drug interacting with a single receptor. In this experiment, a signal above the dotted line represents the bound drug. The fluorescent signals are unambiguous and automated analysis of 445,882 individual drug binding events from 776 individually monitored receptors allows the creation of a probability distribution for drug dissociation (as illustrated in FIG. 11B). In this example a kinetic model fits these data and reveals both a strong and weak binding state; such an observation has been suggested in the literature, but has never been directly observed until now. Because of the clarity with which events are seen, the binding of multiple drugs can also been monitored from the same time traces as illustrated in FIGS. 11A and 11B.

FIG. 12 includes a graph of fluorescent intensity against time. It illustrates an example of changes in the fluorescent intensity of a target element over time as two fluorescent ligands bind and unbind to a protein using the arrangement described above. In particular, FIG. 12 is an illustration of changes in fluorescent intensity of a target element as a first fluorescent ligands binds to a protein then a second ligand binds to the protein followed by the sequential unbinding of the first and second ligands from the protein. Referring to FIG. 12, from time 10 seconds to around 22.5 seconds, no ligands are bound to the protein illustrated by the low and fairly constant fluorescent intensity. At 22.5 seconds, a first ligand binds to the protein illustrated by a step increase in fluorescent intensity. From time around 26 seconds, a second ligand binds to the protein illustrated by the further step increase in fluorescent intensity. From time around time 27 seconds, the second ligand unbinds from the protein illustrated by a step decrease in fluorescent intensity. From time around 27.5 seconds, the second ligand unbinds from the protein illustrated by the further step decrease in fluorescent intensity back down to the original fluorescent intensity when no ligands are bound to the protein.

Figure 13A:
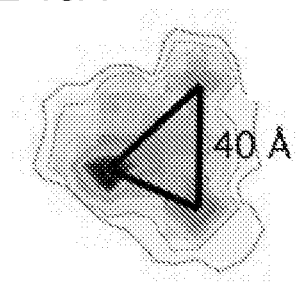
FIGS. 13A, 13B and 13C are probability plots for five separate receptors obtained using the optical microscope of FIG. 2.
Figure 13B:
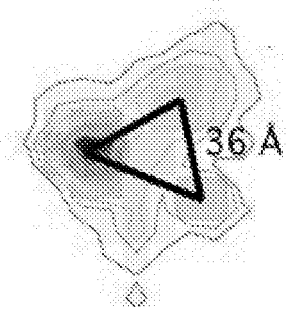
Figure 13C:
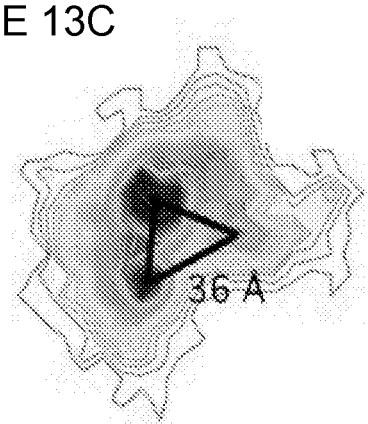
Figure 13D:
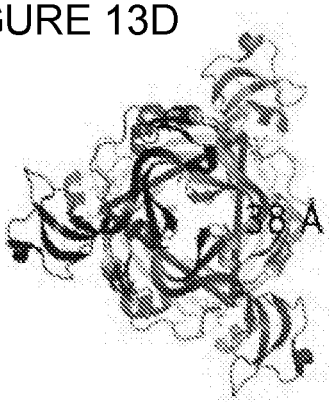
FIG. 13D is an illustration of binding site locations predicted from the crystal structure 4DW1 using the optical microscope of FIG. 2.

Using the same super-resolution imaging technique, the spatial arrangement of multiple ligands was also reconstructed and found to correlate well with the positions of ligand binding sites identified in a co-crystal structure of the P2X4 receptor bound to ATP. FIGS. 13A to 13D illustrate super-resolution images of ATP (a native ligand) bound to individual P2X1 receptors obtained using the arrangement described above. FIGS. 13A to 13C are probability plots for five separate receptors. Each image shows where ATP is located during the course of a 90 second experiment, with lines of equal probability displayed as contours. Three distinct islands of greatest probability are discernible. These correspond exactly with the binding site locations predicted from the crystal structure 4DW1 that is shown in FIG. 13D (Molecular mechanism of ATP binding and ion channel activation in P2X receptors. Hattori, M., Gouaux, E. (2012) Nature 485: 207-212.). We have therefore determined both the number and locations of the binding sites. Importantly, unlike the crystal structure, these single molecular images are dynamic, allowing us to also measure the rate constants for each separate binding event, as described above.

Here we present a description of single-molecule interactions between ligand-gated ion channels and their ligands. We achieve this with high temporal resolution and near atomic-scale spatial resolution. In doing so, we determine ATP stoichiometry on individual P2X1 receptors by analysing the stepwise intensity jumps as ATP molecules bind and unbind, and the spatial arrangement of multiple ligands from reconstructed super-resolution images. The intrinsic rate constants are determined through a stochastic kinetic analysis of probability distributions generated from histograms of single ATP tracks and FCCS. Micro-equilibrium constants are determined by counting micro-states in small ensembles of receptors and through the use of micro-rate constants ($K_a = k_f / k_r$).

Using the high-resolution microscope described here, we observe and identify each microstate associated with ATP binding to individual P2X1 receptors in well-characterised biomimetic systems and use this information to establish the micro-equilibrium constants and intrinsic rate constants that define the precise mechanisms of these interactions. Simply identifying and counting the number of ligand-receptor complexes as well as the number of free receptors in the field of view and taking their ratios is all that is needed to determine micro-equilibrium constants. Intrinsic kinetic rate constants for dissociation are directly observed by recording the length of time ATP is bound. Intrinsic association rates are determined from the measured equilibrium constants and dissociation rates. The experimental approaches described directly monitor drug-receptor interactions at membrane ion channels. Using this method we can also connect multiple-occupancy and a super-resolution analysis to determine the spatial orientation of multiple ligands and the order in which they dissociate from the receptor.

In summary, the optical microscope described provide an approach for observing the kinetic properties of ligand-receptor interactions and a method for drug development. The arrangement used for auto-focusing and image stabilisation utilises embedded nano-spheres and algorithms to enable measurements at an unprecedented temporal and spatial resolution.

The data shown here are examples of a method of analysis that provides extraordinary detail.

These experiments establish a precise mechanism of how molecules bind to each other, and do so with an unprecedented level of detail. This is invaluable across a wide range of research applications, allowing scientists to determine the stoichiometry of proteins, monitor structure-activity relationships of novel drugs and probe the actions of therapeutics. The arrangement and method described herein can be used to study a limitless diversity of molecular interactions across countless disease areas. Furthermore, because only small quantities of each component are needed, experiments can be performed where reagents are in limited supply. The results are complementary to high-resolution techniques that produce static images (i.e. X-ray crystallography, cryo-EM). The arrangement described herein makes real-time measurements at very high resolution.

Embodiments of the present invention have been described. It will be appreciated that variations and modifications may be made to the described embodiments within the scope of the present invention.

Embodiments of the invention may be described by the following numbered clauses.

CLAUSES

1. An optical microscope comprising:
a first optical microscope; and
a second optical microscope with a different mode of operation to the first optical microscope;
wherein the optical microscope is configured such that the first optical microscope and the second optical microscope simultaneously view a sample.

2. An optical microscope according to clause 1, wherein the first optical microscope uses a first light source and the second optical microscope uses a second light source; and the first light source is different to the second light source.

3. An optical microscope according to clause 1 or clause 2, further comprising an objective lens, wherein the first light source and the second light source pass through the objective lens.

4. An optical microscope according to clause 3, wherein the objective lens has a numerical aperture of at least 1.37.

5. An optical microscope according to clause 4, wherein the objective lens has a numerical aperture of at least 1.45.

6. An optical microscope according to any of clauses 3 to 5, wherein the optical microscope is configured such that a sample for imaging is located below the objective lens.

7. An optical microscope according to any preceding clause, wherein the optical microscope is a high resolution optical microscope or a super resolution optical microscope.

8. An optical microscope according to any preceding clause, wherein the first optical microscope is a confocal microscope.

9. An optical microscope according to any preceding clause, wherein the second optical microscope is a total internal reflection fluorescence microscope.

10. An optical microscope according to any preceding clause, wherein the optical microscope is housed in a single housing.

11. An optical microscope according to clause 10, wherein the single housing is in one and only one piece.

12. An optical microscope according to any preceding clause, wherein the optical microscope comprises a dichroic mirror to reflect light from the first optical microscope on to the sample and to allow light from the sample to pass through to a detector.

13. An optical microscope according to any preceding clause, wherein the optical microscope comprises a dichroic mirror to reflect light from the second optical microscope on to the sample and to allow light from the sample to pass through to a detector.

14. An optical microscope according to any preceding clause, wherein the optical microscope comprises a dichroic mirror to route light from the sample from the first optical microscope and from the second optical microscope to respective detectors.

15. An optical microscope according to any preceding clause, wherein an optical route from the sample to a detector comprises a tube lens.

16. An optical microscope according to any preceding clause, wherein the optical microscope comprises a position sensor configured to receive light reflected from the sample from a laser of the second optical microscope.

17. An optical microscope according to clause 16, wherein the position sensor is in communication connection with a computer.

18. An optical microscope according to clause 17, wherein the computer is configured to provide signals to a sample stage to move the sample stage dependent on the received light reflected from the laser of the second optical microscope.

19. An optical microscope according to clause 18, wherein the computer is configured to provide signals to a sample stage to move the sample stage vertically dependent on the received light reflected from the laser of the second microscope.

20. An optical microscope according to any preceding clause, wherein a computer of the optical microscope is configured to capture and store a plurality of images of a sample over time.

21. An optical microscope according to clause 20, wherein the computer processes the plurality of images to provide an output image.

22. An optical microscope according to any preceding clause, wherein the second optical microscope is used to correct drift from the first optical microscope.

23. An optical microscope according to any of clauses 20 to 22, wherein the second optical microscope is used to correct drift from the first optical microscope and/or the sample in the X,Y plane or horizontal plane based on the stored plurality of images of the sample over time.

24. An optical microscope according to clause 22 or clause 23, wherein the second optical microscope is used to correct drift from the first optical microscope and/or sample using at least one reference element located relative to the sample.

25. An optical microscope according to clause 24, wherein the at least one reference element has a diffraction limited intensity distribution of emitted light.

26. An optical microscope according to any preceding clause, wherein the first optical microscope is used to correct drift from the first optical microscope and/or the sample in the Z direction or vertical direction.

27. An optical microscope according to any of clauses 24 to 26, further comprising a beam splitter and at least two detectors configured to detect light from the sample split by the beam splitter from the first optical microscope.

28. An optical microscope according to clause 27, wherein the detectors are at a calibrated focal plane within an axial confocal volume of the first optical microscope.

29. An optical microscope according to any of clauses 27 and 28, wherein the detectors comprise avalanche photo diodes, such as single photon counting avalanche photo diodes.

30. A super resolution optical microscopy sample enclosure for a sample for super resolution optical microscopy, the enclosure comprising:
a base to locate a sample for super resolution optical microscopy; and
a cover, wherein the cover is transparent to light for super resolution optical microscopy, the cover is spaced from the base forming a space for fluid in which to locate the sample, and to form a cover-fluid interface.

31. A super resolution optical microscopy sample enclosure according to clause 30, wherein the base includes a depression configured to locate a sample.

32. A super resolution optical microscopy sample enclosure according to clause 31, wherein the depression comprises an inlet channel and an outlet channel; wherein the enclosure is configured such that fluid enters the depression through the inlet channel passes over a sample in the depression and leaves the depression through the outlet channel.

33. An optical microscopy sample enclosure according to clause 32, wherein the inlet channel and the outlet channel are offset from one another at the depression.

34. An optical microscopy sample enclosure according to clause 33, wherein the inlet channel and the outlet channel are horizontally offset from one another at the depression.

35. An optical microscopy sample enclosure according to any of clauses 32 to 34, wherein the base comprises a plurality of depressions each configured to locate a sample; and wherein each depression comprises an inlet channel and an outlet channel; wherein the enclosure is configured such that fluid enters each depression through its inlet channel passes over a sample in the depression and leaves the depression through its outlet channel.

36. An optical microscopy sample enclosure according to clause 35, comprising 2 to 12 depressions, such as 2, 8 or 12 depressions.

37. An optical microscopy sample enclosure according to any of clauses 31 to 36, wherein the or each depression is etched into the base.

38. An optical microscopy sample enclosure according to any of clauses 31 to 37, wherein the or each inlet channel and/or outlet channel is etched into the base.

39. An optical microscopy sample enclosure according to any of clauses 31 to 38, wherein the edge of the base includes metal, such as steel, for example, steel with a low coefficient of thermal expansion, such as Invar.

40. An optical microscopy sample enclosure according to clause 39, wherein the steel is located around the base except in a portion for viewing the or each depression.

41. A super resolution optical microscope, wherein the super resolution optical microscope is configured such that a sample for imaging is locatable for imaging below at least one optical element of the super resolution optical microscope.

42. A super resolution optical microscope according to clause 41, wherein the at least one optical element comprises an objective lens.

43. A super resolution optical microscope according to clause 41 or 42, wherein the objective lens has a numerical aperture of at least 1.37.

44. A super resolution optical microscope according to clause 41 or 42, wherein the objective lens has a numerical aperture of at least 1.45.

45. A super resolution optical microscope according to any of clauses 41 to 44, wherein the objective lens is housed in an optics chamber.

46. A super resolution optical microscope according to any of clauses 41 to 45, wherein the super resolution optical microscope comprises an optical microscopy sample enclosure for housing a sample for optical microscopy.

47. A super resolution optical microscope according to clause 46, wherein the optical microscopy sample enclosure and the optics chamber housing comprise locating means to locate the optics chamber housing on the optical microscopy sample enclosure.

48. A super resolution optical microscope according to clause 47, wherein the locating means comprise complementary features on the optics chamber housing and on the optical microscopy sample enclosure.

49. A super resolution optical microscope according to clause 48, wherein the complementary features comprise a projecting portion to project over the interface between the optics chamber housing and the optical microscopy sample enclosure.

50. A super resolution optical microscope to clause 48 or clause 49, wherein the complementary features comprise complementary abutting bevelled edges on the optics chamber housing and the optical microscopy sample enclosure.

51. An optical microscope system, the optical microscope system comprising:
a computer; and
an optical microscope configured to capture a plurality of images of a sample over time and output the images to the computer;
wherein the computer is configured to: store the images; process the stored images to correct drift based on the stored images; and output drift corrected images.

52. An optical microscope system according to clause 51, wherein the drift correction is in an X,Y plane or horizontal plane of the optical microscope.

53. An optical microscope system according to clause 51 or clause 52, wherein the drift to correct is from the optical microscope and/or the sample.

54. An optical microscope system according to any of clauses 51 to 53, wherein the microscope is a super resolution optical microscope.

55. An optical microscope system according to any of clauses 51 to 54, wherein the drift correction uses at least one reference element located relative to the sample.

56. An optical microscope system according to clause 55, wherein the at least one reference element has a diffraction limited intensity distribution of emitted light.

57. A computer, wherein the computer is configured to:
store images of a sample captured by an optical microscope;
process the stored images to correct drift based on the stored images; and
output drift corrected images.

58. A computer according to clause 57, wherein the drift correction is in an X,Y plane or horizontal plane of the optical microscope.

59. A computer according to clause 57 or clause 58, wherein the drift to correct is from the optical microscope and/or the sample.

60. A computer according to any of clauses 57 to 59, wherein the microscope is a super resolution optical microscope.

61. A computer according to any of clauses 57 to 60, wherein the drift correction uses at least one reference element located relative to the sample.

62. A computer according to clause 61, wherein the at least one reference element has a diffraction limited intensity distribution of emitted light.

63. A computerized method, the computerized method comprising:
storing images of a sample captured by an optical microscope;
processing the stored images to correct drift based on the stored images; and
outputting drift corrected images.

64. A computer readable medium or non-transitory computer readable medium comprising program code for carrying out the computerized method of clause 63.

65. A computer program for carrying out the computerized method of clause 63.

66. A sample surface for a sample for imaging with a first optical microscope, the sample surface comprising at least one reference element, wherein the or each reference element has a diffraction limited intensity distribution of emitted light from a second optical microscope wherein the second optical microscope has a different mode of operation to the first optical microscope.

67. A sample surface according to clause 66 wherein the first optical microscope and the second optical microscopes are high resolution optical microscopes or super resolution optical microscopes.

68. A sample surface according to clause 66 or clause 67, wherein the first optical microscope is a confocal microscope.

69. A sample surface according to any of clauses 66 to 68, wherein the second optical microscope is a total internal reflection fluorescence microscope.

The invention claimed is:

1. An optical microscope comprising:
a first optical microscope that uses a first light source;
a second optical microscope with a different mode of operation to the first optical microscope, wherein the second optical microscope uses a second light source;
an objective lens, wherein the first light source and the second light source pass through the objective lens;
wherein the objective lens has a numerical aperture of at least 1.37; and
wherein the optical microscope is configured such that the first optical microscope and the second optical microscope simultaneously view a sample.

2. An optical microscope according to claim 1, wherein the first light source is different to the second light source.

3. An optical microscope according to claim 1, wherein the optical microscope is configured such that a sample for imaging is located below the objective lens.

4. An optical microscope according to claim 1, wherein the optical microscope is a high resolution optical microscope or a super resolution optical microscope.

5. An optical microscope according to claim 1, wherein the first optical microscope is a confocal microscope.

6. An optical microscope according to claim 1, wherein the second optical microscope is a total internal reflection fluorescence microscope.

7. An optical microscope according to claim 1, wherein the optical microscope is housed in a single housing.

8. An optical microscope according to claim 7, wherein the single housing is in one and only one piece.

9. An optical microscope according to claim 1, wherein a computer of the optical microscope is configured to capture and store a plurality of images of a sample over time.

10. An optical microscope according to claim 9, wherein the computer processes the plurality of images to provide an output image.

11. An optical microscope according to claim 1, wherein the second optical microscope is used to correct drift from the first optical microscope.

12. An optical microscope according to claim 9, wherein the second optical microscope is used to correct drift from the first optical microscope and/or the sample in an X,Y plane or horizontal plane based on the stored plurality of images of the sample over time.

13. An optical microscope according to claim 11, wherein the second optical microscope is used to correct drift from the first optical microscope and/or sample using at least one reference element located relative to the sample.

14. An optical microscope according to claim 13, wherein the at least one reference element has a diffraction limited intensity distribution of emitted light.

15. An optical microscope according to claim 1, wherein the first optical microscope is used to correct drift from the first optical microscope and/or the sample in a Z direction or a vertical direction.

16. An optical microscope according to claim 13, further comprising a beam splitter and at least two detectors configured to detect light from the sample split by the beam splitter from the first optical microscope.

17. An optical microscope comprising:
a first optical microscope; and
a second optical microscope with a different mode of operation to the first optical microscope;
wherein the optical microscope is configured such that the first optical microscope and the second optical microscope simultaneously view a sample;
wherein a computer of the optical microscope is configured to capture and store a plurality of images of a sample over time; and
wherein the second optical microscope is used to correct drift from the first optical microscope and/or the sample in an X,Y plane or a horizontal plane based at least in part on the stored plurality of images of the sample over time.

18. An optical microscope comprising:
a first optical microscope;
a second optical microscope with a different mode of operation to the first optical microscope;
wherein the optical microscope is configured such that the first optical microscope and the second optical microscope simultaneously view a sample; and
wherein the second optical microscope is used to correct drift from the first optical microscope and/or sample using at least one reference element located relative to the sample.

19. An optical microscope comprising:
a first optical microscope;
a second optical microscope with a different mode of operation to the first optical microscope;
wherein the optical microscope is configured such that the first optical microscope and the second optical microscope simultaneously view a sample; and
wherein the first optical microscope is used to correct drift from the first optical microscope and/or the sample in a Z direction or a vertical direction.

* * * * *